United States Patent
Quan et al.

(10) Patent No.: US 9,699,746 B2
(45) Date of Patent: Jul. 4, 2017

(54) METHOD, APPARATUS, TERMINAL, AND BASE STATION FOR DATA TRANSMISSION

(71) Applicant: HUAWEI TECHNOLOGIES CO., LTD., Shenzhen (CN)

(72) Inventors: Wei Quan, Beijing (CN); Yi Jiang, Shenzhen (CN); Pengyu Ji, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 81 days.

(21) Appl. No.: 14/700,240

(22) Filed: Apr. 30, 2015

(65) Prior Publication Data

US 2015/0237589 A1    Aug. 20, 2015

Related U.S. Application Data

(63) Continuation of application No. PCT/CN2012/083743, filed on Oct. 30, 2012.

(51) Int. Cl.
   *H04J 3/06*    (2006.01)
   *H04W 56/00*   (2009.01)
   *H04W 72/04*   (2009.01)

(52) U.S. Cl.
   CPC ..... *H04W 56/001* (2013.01); *H04W 72/0406* (2013.01)

(58) Field of Classification Search
   None
   See application file for complete search history.

(56) References Cited

U.S. PATENT DOCUMENTS 8,312,336 B2 * 11/2012 Chun .............. H04L 1/1822
                                          714/748
8,917,669 B2 * 12/2014 Park ............... H04L 1/1812
                                          370/328
(Continued)

FOREIGN PATENT DOCUMENTS

CN    101841905    9/2010
CN    102057740    5/2011
(Continued)

OTHER PUBLICATIONS

PCT International Search Report dated Jul. 25, 2013 in corresponding International Patent Application No. PCT/CN2012/083743.
(Continued)

*Primary Examiner* — Anh-Vu Ly
(74) *Attorney, Agent, or Firm* — Staas & Halsey LLP

(57) ABSTRACT

A method, an apparatus, a terminal, and a base station for data transmission are provided. The method includes: when downlink data is received after a TAT expires, determining whether a first preset parameter of a UE satisfies a first uplink synchronization maintenance condition; and when the first parameter of the UE satisfies the first uplink synchronization maintenance condition, sending, to a base station, a feedback corresponding to the downlink data; or when the first parameter of the UE does not satisfy the first uplink synchronization maintenance condition, skipping sending, to the base station, a feedback corresponding to the downlink data, where the feedback is used to indicate whether the downlink data is received correctly, and the first synchronization maintenance condition is used to determine that the UE still maintains an uplink in-sync state after the TAT expires.

20 Claims, 12 Drawing Sheets

(56) References Cited

U.S. PATENT DOCUMENTS

| | | | |
|---|---|---|---|
| 2010/0074202 A1* | 3/2010 | Park | H04W 56/004 370/329 |
| 2010/0080155 A1 | 4/2010 | Suzuki et al. | |
| 2010/0325226 A1 | 12/2010 | McBeath et al. | |
| 2011/0249578 A1* | 10/2011 | Nayeb Nazar | H04L 1/0027 370/252 |

FOREIGN PATENT DOCUMENTS

| | | |
|---|---|---|
| CN | 102217397 | 10/2011 |
| EP | 2 166 802 A1 | 3/2010 |
| WO | 2011/085200 A1 | 7/2011 |

OTHER PUBLICATIONS

Extended European Search Report dated Nov. 19, 2015 in corresponding European Patent Application No. 12887574.7.
"Adjustment of time advance when TAT is not running", 3GPP TSG-RAN WG2 Meeting #79bis, R2-124460, Bratislava, Slovakia, Oct. 8-13, 2012, 4pp.
International Search Report mailed Jul. 25, 2013 in corresponding International Application No. PCT/CN2012/083743.

* cited by examiner

METHOD, APPARATUS, TERMINAL, AND BASE STATION FOR DATA TRANSMISSION

CROSS REFERENCE

This application is a continuation of International Application No. PCT/CN2012/083743, filed on Oct. 30, 2012, which is hereby incorporated by reference in its entirety.

TECHNICAL FIELD

The present invention relates to the field of communications, and in particular, to a method, an apparatus, a terminal, and a base station for data transmission.

BACKGROUND

In an LTE (Long Time Evolution, Long Time Evolution) system, by using a configurable TAT (Time Alignment Timer, time alignment timer), a UE (User Equipment, user equipment) controls a time for which the UE maintains uplink synchronization. Specifically, if the TAT is running, it is considered that the UE is in an uplink in-sync state; if the TAT expires, it is considered that the UE is in an uplink out-of-sync state.

In the prior art, if downlink data sent by an eNB (eNode B, base station) is received, the UE needs to send, to the eNB, a feedback corresponding to the downlink data, where the feedback is used to notify the eNB whether the UE correctly receives the downlink data. Because it is considered that the UE is in the uplink out-of-sync state after the TAT expires, if the UE receives the downlink data sent by the eNB to the UE, the UE cannot send the feedback corresponding to the downlink data. To enable the UE to send the feedback corresponding to the downlink data, generally, before sending the downlink data, the eNB notifies the UE to execute random access to obtain uplink synchronization. Afterward, the eNB sends the downlink data, and the UE sends the feedback corresponding to the downlink data after receiving the data.

Therefore, if the UE receives the downlink data after the TAT expires, the UE cannot send, to the eNB, the feedback corresponding to the downlink data; consequently, the eNB may retransmit the downlink data for multiple times, downlink data transmission resources between the eNB and the UE are wasted, and an additional signaling overhead and delay are also caused when the UE executes a random access procedure.

SUMMARY

Embodiments of the present invention provide a method, an apparatus, a terminal, and a base station for data transmission after a TA timer expires, which can reduce a waste of downlink data transmission resources between an eNB and a UE and avoid a signaling overhead and delay caused by a random access procedure.

According to a first aspect, a method for data transmission is provided, including:

when downlink data is received after a TAT expires, determining whether a first parameter of a UE satisfies a first uplink synchronization maintenance condition; and when the first parameter of the UE satisfies the first uplink synchronization maintenance condition, sending, to a base station, a feedback corresponding to the downlink data; or when the first parameter of the UE does not satisfy the first uplink synchronization maintenance condition, skipping sending, to the base station, a feedback corresponding to the downlink data, where the feedback is used to indicate whether the downlink data is received correctly, and the first synchronization maintenance condition is used to determine that the UE still maintains an uplink in-sync state after the TAT expires.

With reference to the first aspect, in a first possible implementation manner, the determining whether a first parameter of a UE satisfies a first uplink synchronization maintenance condition includes:

determining, according to the first parameter of the UE, whether the first parameter of the UE satisfies the first uplink synchronization maintenance condition; or predetermining whether the first parameter of the UE satisfies the first uplink synchronization maintenance condition, and storing a result of the determining; and acquiring the result of the determining, and determining, according to the result of the determining, whether the first parameter of the UE satisfies the first uplink synchronization maintenance condition.

With reference to the first aspect, and/or the first possible implementation manner, in a second possible implementation manner, the first parameter includes a first feedback parameter, and the first feedback parameter is used to indicate whether the UE feeds back with respect to the downlink data after the TAT expires; and the determining whether the first parameter of the UE satisfies the first uplink synchronization maintenance condition includes: determining whether the first feedback parameter is that the UE feeds back with respect to the downlink data after the TAT expires; and/or the first parameter includes a first feedback parameter and a time span between a time of receiving the downlink data and a time of expiry of the TAT; and the determining whether the first parameter of the UE satisfies the first uplink synchronization maintenance condition includes: determining whether the first feedback parameter is that the UE feeds back with respect to the downlink data after the TAT expires, and determining whether the time span between the time of receiving the downlink data and the time of expiry of the TAT is not greater than a first time span threshold; and/or the first parameter includes a moving speed of the UE; and the determining whether the first parameter of the UE satisfies the first uplink synchronization maintenance condition includes: determining whether the moving speed of the UE is not greater than a moving speed threshold; and/or the first parameter includes a TAT running duration type; and the determining whether the first parameter of the UE satisfies the first uplink synchronization maintenance condition includes: determining whether the TAT running duration type is a conservative configuration; and/or the first parameter includes whether to use the TAT; and the determining whether the first parameter of the UE satisfies the first uplink synchronization maintenance condition includes: determining whether the first parameter is not to use the TAT.

With reference to the first aspect, and/or the first possible implementation manner, and/or the second possible implementation manner, in a third possible implementation manner, the method further includes:

when the TAT expires, determining whether a second parameter of the UE satisfies a second uplink synchronization maintenance condition; and when the second parameter of the UE satisfies the second uplink synchronization maintenance condition, reserving a first resource; or when the second parameter of the UE does not satisfy the second uplink synchronization maintenance condition, releasing all resources inclusive of the first resource, where the second uplink synchronization maintenance condition is used to determine that the UE still maintains the uplink in-sync state after the TAT expires.

With reference to the first aspect, and/or the first possible implementation manner, and/or the second possible implementation manner, and/or the third possible implementation manner, in a fourth possible implementation manner, the determining whether a second parameter of the UE satisfies a second uplink synchronization maintenance condition includes:

determining, according to the second parameter of the UE, whether the second parameter of the UE satisfies the second uplink synchronization maintenance condition; or predetermining whether the second parameter of the UE satisfies the second uplink synchronization maintenance condition, and storing a result of the determining; and acquiring the result of the determining, and determining, according to the result of the determining, whether the second parameter of the UE satisfies the second uplink synchronization maintenance condition.

With reference to the first aspect, and/or the first possible implementation manner, and/or the second possible implementation manner, and/or the third possible implementation manner, and/or the fourth possible implementation manner, in a fifth possible implementation manner, the second parameter includes a first resource reservation parameter, where the first resource reservation parameter is used to indicate whether the UE reserves and uses the first resource for sending first information after the TAT expires; and the determining whether the second parameter of the UE satisfies the second uplink synchronization maintenance condition includes: determining whether the first resource reservation parameter is that the UE reserves and uses the first resource for sending the first information after the TAT expires; and/or the second parameter includes a moving speed of the UE; and the determining whether the second parameter of the UE satisfies the second uplink synchronization maintenance condition includes: determining whether the moving speed of the UE is not greater than a moving speed threshold; and/or the second parameter includes a TAT running duration type, where the TAT running duration type is used to indicate whether TAT running duration configured by the base station for the UE is a conservative configuration; and the determining whether the second parameter of the UE satisfies the second uplink synchronization maintenance condition includes: determining whether the TAT running duration type is a conservative configuration; and/or the second parameter includes whether to use the TAT; and the determining whether the second parameter of the UE satisfies the second uplink synchronization maintenance condition includes: determining whether the second parameter is not to use the TAT.

With reference to the first aspect, and/or the first possible implementation manner, and/or the second possible implementation manner, and/or the third possible implementation manner, and/or the fourth possible implementation manner, and/or the fifth possible implementation manner, in a sixth possible implementation manner, the method further includes:

when the TAT expires, if it is determined that the second parameter of the UE satisfies the second uplink synchronization maintenance condition, starting a second timer; and correspondingly, the method further includes:

determining whether the second timer expires; and if the second timer does not expire, reserving the first resource; or if the second timer expires, releasing the first resource.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the method further includes:

when the first resource is reserved, if the first information needs to be sent, using the corresponding first resource to send the first information; or when the first resource is released, if the first information needs to be sent, executing a random access procedure, and after uplink synchronization is successfully obtained through the random access procedure and the first resource is obtained through request, using the first resource to send the first information to the base station.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, the method further includes:

when the first resource is reserved, if the first information needs to be sent, executing a random access procedure, and after uplink synchronization is successfully obtained through the random access procedure, using the first resource to send the first information to the base station; or when the first resource is released, if the first information needs to be sent, executing a random access procedure, and after uplink synchronization is successfully obtained through the random access procedure and the first resource is obtained through request, using the first resource to send the first information to the base station.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, the method further includes:

receiving a handover command message sent by a source base station in a handover procedure, where the handover command message includes configuration information of the first resource, and the configuration information is sent by a target base station to the source base station; and using, according to the handover command message, the first resource configured according to the configuration information to send the first information, to access the target base station.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, the method further includes:

receiving a broadcast message sent by the base station, where the broadcast message includes the configuration information of the first resource; and during initial access or access reestablishment, if the first information needs to be sent, using the first resource configured according to the configuration information to send the first information.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, the first resource includes an SR resource, and correspondingly, the first information includes an SR; and/or the first resource includes a CQI resource, and correspondingly, the first information includes a CQI; and/or the first resource includes a PMI resource, and correspondingly, the first information includes a PMI; and/or the first resource includes an RI resource, and correspondingly, the first information includes an RI; and/or the first resource includes an SRS resource, and correspondingly, the first information includes an SRS.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, in a twelfth possible implementation manner, the method further includes:

when the first parameter of the UE satisfies the first uplink synchronization maintenance condition and/or in a period in which the first resource is reserved, if an aperiodic CQI reporting instruction sent by the base station is received, reporting an aperiodic CQI to the base station in a resource that is scheduled by the base station in advance for the current aperiodic CQI reporting.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, and/or the twelfth possible implementation manner, in a thirteenth possible implementation manner, the method further includes:

when the first parameter of the UE satisfies the first uplink synchronization maintenance condition and/or in a period in which the first resource is reserved, if an aperiodic SRS reporting instruction sent by the base station is received, reporting an aperiodic SRS to the base station in a resource that is scheduled by the base station in advance for the current aperiodic SRS reporting.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, and/or the twelfth possible implementation manner, and/or the thirteenth possible implementation manner, in a fourteenth possible implementation manner, the first parameter and/or the second parameter are/is configured by the base station for the UE by using an RRC message or a MAC-layer message or a physical-layer message.

With reference to the first aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, and/or the twelfth possible implementation manner, and/or the thirteenth possible implementation manner, and/or the fourteenth possible implementation manner, in a fifteenth possible implementation manner, the method further includes:

when access to the base station fails during execution of the random access procedure, stopping a started TAT, and stopping applying a TAC in a random access response received in the random access procedure.

According to a second aspect, an apparatus for data transmission is provided, including:

a first determining unit, configured to: when downlink data is received after a TAT expires, determine whether a first parameter of a UE satisfies a first uplink synchronization maintenance condition;

a first feedback unit, configured to: when the first determining unit determines that the first parameter of the UE satisfies the first uplink synchronization maintenance condition, send, to a base station, a feedback corresponding to the downlink data, where the feedback is used to indicate whether the downlink data is received correctly, and the first synchronization maintenance condition is used to determine that the UE still maintains an uplink in-sync state after the TAT expires; and a second feedback unit, configured to: when the first determining unit determines that the first parameter of the UE does not satisfy the first uplink synchronization maintenance condition, skip sending, to the base station, a feedback corresponding to the downlink data.

With reference to the second aspect, in a first possible implementation manner, the first determining unit is specifically configured to:

determine, according to the first parameter of the UE, whether the first parameter of the UE satisfies the first uplink synchronization maintenance condition; or predetermine whether the first parameter of the UE satisfies the first uplink synchronization maintenance condition, and store a result of the determining; and acquire the result of the determining, and determine, according to the result of the determining, whether the first parameter of the UE satisfies the first uplink synchronization maintenance condition.

With reference to the second aspect, and/or the first possible implementation manner, in a second possible implementation manner, the first parameter includes a first feedback parameter, and the first feedback parameter is used to indicate whether the UE feeds back with respect to the downlink data after the TAT expires; and the first determining unit is specifically configured to determine, in the following manner, whether the first parameter of the UE satisfies the first uplink synchronization maintenance condition: determining whether the first feedback parameter is that the UE feeds back with respect to the downlink data after the TAT expires; and/or the first parameter includes a first feedback parameter and a time span between a time of receiving the downlink data and a time of expiry of the TAT; and the first determining unit is specifically configured to determine, in the following manner, whether the first parameter of the UE satisfies the first uplink synchronization maintenance condition: determining whether the first feedback parameter is that the UE feeds back with respect to the downlink data after the TAT expires, and determining whether the time span between the time of receiving the downlink data and the time of expiry of the TAT is not greater than a first time span threshold; and/or the first parameter includes a moving speed of the UE; and the first determining unit is specifically configured to determine, in the following manner, whether the first parameter of the UE satisfies the first uplink synchronization maintenance condition: determining whether the moving speed of the UE is not greater than a moving speed threshold; and/or the first parameter includes a TAT running duration type; and the first determining unit is specifically configured to determine, in the following manner, whether the first parameter of the UE satisfies the first uplink synchronization maintenance condition: determining whether the TAT running duration type is a conservative configuration; and/or the first parameter includes whether to use the TAT; and the first determining unit is specifically configured to determine, in the following manner, whether the first parameter of the UE satisfies the first uplink synchronization maintenance condition: determining whether the first parameter is not to use the TAT.

With reference to the second aspect, and/or the first possible implementation manner, and/or the second possible implementation manner, in a third possible implementation manner, the apparatus further includes:

a second determining unit, configured to: when the TAT expires, determine whether a second parameter of the UE satisfies a second uplink synchronization maintenance condition; and a resource releasing unit, configured to: when the second determining unit determines that the second parameter of the UE satisfies the second uplink synchronization maintenance condition, reserve a first resource; or when the second determining unit determines that the second parameter of the UE does not satisfy the second uplink synchronization maintenance condition, release all resources inclusive of the first resource, where the second uplink synchronization maintenance condition is used to determine that the UE still maintains the uplink in-sync state after the TAT expires.

With reference to the second aspect, and/or the first possible implementation manner, and/or the second possible implementation manner, and/or the third possible implementation manner, in a fourth possible implementation manner, the second determining unit is specifically configured to:

determine, according to the second parameter of the UE, whether the second parameter of the UE satisfies the second uplink synchronization maintenance condition; or predetermine whether the second parameter of the UE satisfies the second uplink synchronization maintenance condition, and store a result of the determining; and acquire the result of the determining, and determine, according to the result of the determining, whether the second parameter of the UE satisfies the second uplink synchronization maintenance condition.

With reference to the second aspect, and/or the first possible implementation manner, and/or the second possible implementation manner, and/or the third possible implementation manner, and/or the fourth possible implementation manner, in a fifth possible implementation manner, the second parameter includes a first resource reservation parameter, where the first resource reservation parameter is used to indicate whether the UE reserves and uses the first resource for sending first information after the TAT expires; and the second determining unit is specifically configured to determine, in the following manner, whether the second parameter of the UE satisfies the second uplink synchronization maintenance condition: determining whether the first resource reservation parameter is that the UE reserves and uses the first resource for sending the first information after the TAT expires; and/or the second parameter includes a moving speed of the UE; and the second determining unit is specifically configured to determine, in the following manner, whether the second parameter of the UE satisfies the second uplink synchronization maintenance condition: determining whether the moving speed of the UE is not greater than a moving speed threshold; and/or the second parameter includes a TAT running duration type, where the TAT running duration type is used to indicate whether TAT running duration configured by the base station for the UE is a conservative configuration; and the second determining unit is specifically configured to determine, in the following manner, whether the second parameter of the UE satisfies the second uplink synchronization maintenance condition: determining whether the TAT running duration type is a conservative configuration; and/or the second parameter includes whether to use the TAT; and the second determining unit is specifically configured to determine, in the following manner, whether the second parameter of the UE satisfies the second uplink synchronization maintenance condition: determining whether the second parameter is not to use the TAT.

With reference to the second aspect, and/or the first possible implementation manner, and/or the second possible implementation manner, and/or the third possible implementation manner, and/or the fourth possible implementation manner, and/or the fifth possible implementation manner, in a sixth possible implementation manner, the apparatus further includes:

a second starting unit, configured to: when the TAT expires, if the second determining unit determines that the second parameter of the UE satisfies the second uplink synchronization maintenance condition, start a second timer, where correspondingly, the resource releasing unit is further configured to: determine whether the second timer expires;

and when the second timer does not expire, reserve the first resource; or when the second timer expires, release the first resource.

With reference to the second aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the apparatus further includes:

a first data sending unit, configured to: when the first resource is reserved by the resource releasing unit, if the first information needs to be sent, use the corresponding first resource to send the first information; or when the first resource is released by the resource releasing unit, if the first information needs to be sent, execute a random access procedure, and after uplink synchronization is successfully obtained through the random access procedure and the first resource is obtained through request, use the first resource to send the first information to the base station.

With reference to the second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, the apparatus further includes:

a second data sending unit, configured to: when the first resource is reserved by the resource releasing unit, if the first information needs to be sent, execute a random access procedure, and after uplink synchronization is successfully obtained through the random access procedure, use the first resource to send the first information to the base station; or when the first resource is released by the resource releasing unit, if the first information needs to be sent, execute a random access procedure, and after uplink synchronization is successfully obtained through the random access procedure and the first resource is obtained through request, use the first resource to send the first information to the base station.

With reference to the second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, the apparatus further includes:

a first data receiving unit, configured to receive a handover command message sent by a source base station in a handover procedure, where the handover command message includes configuration information of the first resource, and the configuration information is sent by a target base station to the source base station; and a third data sending unit, configured to use, according to the handover command message, the first resource configured according to the configuration information to send the first information, to access the target base station.

With reference to the second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, the apparatus further includes:

a second data receiving unit, configured to receive a broadcast message sent by the base station, where the broadcast message includes the configuration information of the first resource; and a fourth data sending unit, configured to: during initial access or access reestablishment, if the first information needs to be sent, use the first resource configured according to the configuration information to send the first information.

With reference to the second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, the first resource includes an SR resource, and correspondingly, the first information includes an SR; and/or the first resource includes a CQI resource, and correspondingly, the first information includes a CQI; and/or the first resource includes a PMI resource, and correspondingly, the first information includes a PMI; and/or the first resource includes an RI resource, and correspondingly, the first information includes an RI; and/or the first resource includes an SRS resource, and correspondingly, the first information includes an SRS.

With reference to the second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, in a twelfth possible implementation manner, the apparatus further includes:

a CQI reporting unit, configured to: when the first parameter of the UE satisfies the first uplink synchronization maintenance condition and/or in a period in which the first resource is reserved, if an aperiodic CQI reporting instruction sent by the base station is received, report an aperiodic CQI to the base station in a resource that is scheduled by the base station in advance for the current aperiodic CQI reporting.

With reference to the second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, and/or the twelfth possible implementation manner, in a thirteenth possible implementation manner, the apparatus further includes:

an SRS reporting unit, configured to: when the first parameter of the UE satisfies the first uplink synchronization maintenance condition and/or in a period in which the first resource is reserved, if an aperiodic SRS reporting instruction sent by the base station is received, report an aperiodic SRS to the base station in a resource that is scheduled by the base station in advance for the current aperiodic SRS reporting.

With reference to the second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, and/or the twelfth possible implementation manner, and/or the thirteenth possible implementation manner, in a fourteenth possible implementation manner, the first parameter and/or the second parameter are/is configured by the base station for the UE by using an RRC message or a MAC-layer message or a physical-layer message.

With reference to the second aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, and/or the twelfth possible implementation manner, and/or the thirteenth possible implementation manner, and/or the fourteenth possible implementation manner, in a fifteenth possible implementation manner, the apparatus further includes:

a stopping unit, configured to: when access to the base station fails during execution of the random access procedure, stop a started TAT, and stop applying a TAC in a random access response received in the random access procedure.

According to a third aspect, a UE is provided, including a data processor and a radio transceiver, where:
the data processor is configured to: when the radio transceiver receives downlink data after a TAT expires, determine whether a first parameter of the UE satisfies a first uplink synchronization maintenance condition; and
the radio transceiver is configured to receive the downlink data, and further configured to: when the data processor determines that the first parameter of the UE satisfies the first uplink synchronization maintenance condition, send, to a base station, a feedback corresponding to the downlink data; or when the first parameter of the UE does not satisfy the first uplink synchronization maintenance condition, skip sending, to the base station, a feedback corresponding to the downlink data, where
the feedback is used to indicate whether the downlink data is received correctly, and the first synchronization maintenance condition is used to determine that the UE still maintains an uplink in-sync state after the TAT expires.

With reference to the third aspect, in a first possible implementation manner, the data processor is specifically configured to:

determine, according to the first parameter of the UE, whether the first parameter of the UE satisfies the first uplink synchronization maintenance condition; or
predetermine whether the first parameter of the UE satisfies the first uplink synchronization maintenance condition, and store a result of the determining; and
acquire the result of the determining, and determine, according to the result of the determining, whether the first parameter of the UE satisfies the first uplink synchronization maintenance condition.

With reference to the third aspect, and/or the first possible implementation manner, in a second possible implementation manner, the first parameter includes a first feedback parameter, and the first feedback parameter is used to indicate whether the UE feeds back with respect to the downlink data after the TAT expires; and
the data processor is specifically configured to determine whether the first feedback parameter is that the UE feeds back with respect to the downlink data after the TAT expires; and/or
the first parameter includes a first feedback parameter and a time span between a time of receiving the downlink data and a time of expiry of the TAT; and
the data processor is specifically configured to determine whether the first feedback parameter is that the UE feeds back with respect to the downlink data after the TAT expires, and determine whether the time span between the time of receiving the downlink data and the time of expiry of the TAT is not greater than a first time span threshold; and/or
the first parameter includes a moving speed of the UE; and the data processor is specifically configured to determine whether the moving speed of the UE is not greater than a moving speed threshold; and/or
the first parameter includes a TAT running duration type; and the data processor is specifically configured to determine whether the TAT running duration type is a conservative configuration; and/or
the first parameter includes whether to use the TAT; and the data processor is specifically configured to determine whether the first parameter is not to use the TAT.

With reference to the third aspect, and/or the first possible implementation manner, and/or the second possible implementation manner, in a third possible implementation manner, the data processor is further configured to: when the TAT expires, determine whether a second parameter of the UE satisfies a second uplink synchronization maintenance condition; and
the radio transceiver is further configured to: when the data processor determines that the second parameter of the UE satisfies the second uplink synchronization maintenance condition, reserve a first resource; or when the second parameter of the UE does not satisfy the second uplink synchronization maintenance condition, release all resources inclusive of the first resource, where the second uplink synchronization maintenance condition is used to determine that the UE still maintains the uplink in-sync state after the TAT expires.

With reference to the third aspect, and/or the first possible implementation manner, and/or the second possible implementation manner, and/or the third possible implementation manner, in a fourth possible implementation manner, the data processor is specifically configured to:
determine, according to the second parameter of the UE, whether the second parameter of the UE satisfies the second uplink synchronization maintenance condition; or predetermine whether the second parameter of the UE satisfies the second uplink synchronization maintenance condition, and store a result of the determining; and acquire the result of the determining, and determine, according to the result of the determining, whether the second parameter of the UE satisfies the second uplink synchronization maintenance condition.

With reference to the third aspect, and/or the first possible implementation manner, and/or the second possible implementation manner, and/or the third possible implementation manner, and/or the fourth possible implementation manner, in a fifth possible implementation manner, the second parameter includes a first resource reservation parameter, where the first resource reservation parameter is used to indicate whether the UE reserves and uses the first resource for sending first information after the TAT expires; and the data processor is specifically configured to determine whether the first resource reservation parameter is that the UE reserves and uses the first resource for sending the first information after the TAT expires; and/or the second parameter includes a moving speed of the UE; and the data processor is specifically configured to determine whether the moving speed of the UE is not greater than a moving speed threshold; and/or the second parameter includes a TAT running duration type, where the TAT running duration type is used to indicate whether TAT running duration configured by the base station for the UE is a conservative configuration; and the data processor is specifically configured to determine whether the TAT running duration type is a conservative configuration; and/or the second parameter includes whether to use the TAT; and the data processor is specifically configured to determine whether the second parameter is not to use the TAT.

With reference to the third aspect, and/or the first possible implementation manner, and/or the second possible implementation manner, and/or the third possible implementation manner, and/or the fourth possible implementation manner, and/or the fifth possible implementation manner, in a sixth possible implementation manner, the UE further includes a second timer, where:

correspondingly, the data processor is further configured to: when the TAT expires, if it is determined that the second parameter of the UE satisfies the second uplink synchronization maintenance condition, start the second timer; and correspondingly, the data processor is further configured to: determine whether the second timer expires; and when the second timer does not expire, reserve the first resource; or when the second timer expires, release the first resource.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the radio transceiver is further configured to: when the first resource is reserved, if the first information needs to be sent, use the corresponding first resource to send the first information; or when the first resource is released, if the first information needs to be sent, execute a random access procedure, and after uplink synchronization is successfully obtained through the random access procedure and the first resource is obtained through request, use the first resource to send the first information to the base station.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, the radio transceiver is further configured to: when the first resource is reserved, if the first information needs to be sent, execute a random access procedure, and after uplink synchronization is successfully obtained through the random access procedure, use the first resource to send the first information to the base station; or when the first resource is released, if the first information needs to be sent, execute a random access procedure, and after uplink synchronization is successfully obtained through the random access procedure and the first resource is obtained through request, use the first resource to send the first information to the base station.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, the radio transceiver is further configured to: receive a handover command message sent by a source base station in a handover procedure, where the handover command message includes configuration information of the first resource, and the configuration information is sent by a target base station to the source base station; and use, according to the handover command message, the first resource configured according to the configuration information to send the first information, to access the target base station.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, the radio transceiver is further configured to:

receive a broadcast message sent by the base station, where the broadcast message includes the configuration information of the first resource; and during initial access or access reestablishment, if the first information needs to be sent, use the first resource configured according to the configuration information to send the first information.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, the first resource includes an SR resource, and correspondingly, the first information includes an SR; and/or the first resource includes a CQI resource, and correspondingly, the first information includes a CQI; and/or the first resource includes a PMI resource, and correspondingly, the first information includes a PMI; and/or the first resource includes an RI resource, and correspondingly, the first information includes an RI; and/or the first resource includes an SRS resource, and correspondingly, the first information includes an SRS.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, in a twelfth possible implementation manner, the radio transceiver is further configured to: when the first parameter of the UE satisfies the first uplink synchronization maintenance condition and/or in a period in which the first resource is reserved, if an aperiodic CQI reporting instruction sent by the base station is received, report an aperiodic CQI to the base station in a resource that is scheduled by the base station in advance for the current aperiodic CQI reporting.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, and/or the twelfth possible implementation manner, in a thirteenth possible implementation manner, the radio transceiver is further configured to: when the first parameter of the UE satisfies the first uplink synchronization maintenance condition and/or in a period in which the first resource is reserved, if an aperiodic SRS reporting instruction sent by the base station is received, report an aperiodic SRS to the base station in a resource that is scheduled by the base station in advance for the current aperiodic SRS reporting.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, and/or the twelfth possible implementation manner, and/or the thirteenth possible implementation manner, in a fourteenth possible implementation manner, the first parameter and/or the second parameter are/is configured by the base station for the UE by using an RRC message or a MAC-layer message or a physical-layer message.

With reference to the third aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, and/or the twelfth possible implementation manner, and/or the thirteenth possible implementation manner, and/or the fourteenth possible implementation manner, in a fifteenth possible implementation manner, the data processor is further configured to: when access to the base station fails during execution of the random access procedure, stop a started TAT, and stop applying a TAC in a random access response received in the random access procedure.

According to a fourth aspect, a method for data transmission is provided, including:

sending downlink data to a UE after a TAT of the UE expires; and receiving a feedback that is sent by the UE with respect to the downlink data, where the feedback is sent by the UE when the UE determines that a first parameter satisfies a first uplink synchronization maintenance condition.

With reference to the fourth aspect, in a first possible implementation manner, before sending the downlink data to the UE, the method further includes:

sending a first configuration parameter to the UE, where the first configuration parameter is a parameter required for the UE to determine whether the first parameter satisfies the first uplink synchronization maintenance condition.

With reference to the fourth aspect, and/or the first possible implementation manner, in a second possible implementation manner, when the first parameter includes a first feedback parameter, the first configuration parameter includes the first feedback parameter of the UE; and/or when the first parameter includes a first feedback parameter and a time span between a time of receiving the downlink data and a time of expiry of the TAT, the first configuration parameter includes the first feedback parameter and/or a first time span threshold corresponding to the time span; and/or when the first parameter includes a moving speed of the UE, the first configuration parameter includes the moving speed of the UE and/or a moving speed threshold; and/or when the first parameter includes a TAT running duration type, the first configuration parameter includes the TAT running duration type; and/or when the first parameter includes whether to use the TAT, the first configuration parameter includes whether to use the TAT.

With reference to the fourth aspect, and/or the first possible implementation manner, and/or the second possible implementation manner, in a third possible implementation manner, the method further includes:

after the TAT of the UE expires, receiving first information that is sent by the UE by using a reserved first resource, where the first resource is reserved when the UE determines that a second parameter satisfies a second uplink synchronization maintenance condition.

With reference to the fourth aspect, and/or the first possible implementation manner, and/or the second possible implementation manner, and/or the third possible implementation manner, in a fourth possible implementation manner, before receiving the first information, the method further includes:

sending a second configuration parameter to the UE, where the second configuration parameter is a parameter required for the UE to determine whether the second parameter satisfies the second uplink synchronization maintenance condition.

With reference to the fourth aspect, and/or the first possible implementation manner, and/or the second possible implementation manner, and/or the third possible implementation manner, and/or the fourth possible implementation manner, in a fifth possible implementation manner, when the second parameter includes a first resource reservation parameter, the second configuration parameter includes the first resource reservation parameter; and/or when the second parameter includes a moving speed of the UE, the second configuration parameter includes the moving speed of the UE and/or a moving speed threshold; and/or when the second parameter includes a TAT running duration type, the second configuration parameter includes the TAT running duration type; and/or when the second parameter includes whether to use the TAT, the second configuration parameter includes whether to use the TAT.

With reference to the fourth aspect, and/or the first possible implementation manner, and/or the second possible implementation manner, and/or the third possible implementation manner, and/or the fourth possible implementation manner, and/or the fifth possible implementation manner, in a sixth possible implementation manner, after sending the second configuration parameter to the UE, and before receiving the first information, the method further includes:

executing a random access procedure with the UE, so that the UE obtains uplink synchronization.

With reference to the fourth aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the method further includes:

sending a handover command message to the UE in a handover procedure, where the handover command message includes configuration information of the first resource, and the configuration information is sent by a target base station; and receiving the first information that is sent by the UE according to the handover command message by using the first resource configured according to the configuration information.

With reference to the fourth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, the method further includes:

sending a broadcast message to the UE, where the broadcast message includes the configuration information of the first resource; and receiving the first information that is sent by the UE during initial access or access reestablishment by using the first resource configured according to the configuration information.

With reference to the fourth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, the first resource includes an SR resource, and correspondingly, the first information includes an SR; and/or the first resource includes a CQI resource, and correspondingly, the first information includes a CQI; and/or the first resource includes a PMI resource, and correspondingly, the first information includes a PMI; and/or the first resource includes an RI resource, and correspondingly, the first information includes an RI; and/or the first resource includes an SRS resource, and correspondingly, the first information includes an SRS.

With reference to the fourth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, the method further includes:

when the first parameter of the UE satisfies the first uplink synchronization maintenance condition and/or in a period in which the first resource is reserved, sending an aperiodic CQI reporting instruction to the UE, and receiving an aperiodic CQI report of the UE in a resource that is scheduled in advance for the current aperiodic CQI reporting.

With reference to the fourth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, the method further includes:

when the first parameter of the UE satisfies the first uplink synchronization maintenance condition and/or in a period in which the first resource is reserved, sending an aperiodic SRS reporting instruction to the UE, and receiving an aperiodic SRS report of the UE in a resource that is scheduled in advance for the current aperiodic SRS reporting.

With reference to the fourth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, in a twelfth possible implementation manner, the first configuration parameter and/or the second configuration parameter are/is sent to the UE by using an RRC message or a MAC-layer message or a physical-layer message.

According to a fifth aspect, an apparatus for data transmission is provided, including:

a first sending unit, configured to send downlink data to a UE after a TAT of the UE expires; and a first receiving unit, configured to receive a feedback that is sent by the UE with respect to the downlink data sent by the first sending unit, where the feedback is sent by the UE when the UE determines that a first parameter satisfies a first uplink synchronization maintenance condition.

With reference to the fifth aspect, in a first possible implementation manner, the first sending unit is further configured to: before sending the downlink data to the UE, send a first configuration parameter to the UE, where the first configuration parameter is a parameter required for the UE to determine whether the first parameter satisfies the first uplink synchronization maintenance condition.

With reference to the fifth aspect, and/or the first possible implementation manner, in a second possible implementation manner, when the first parameter includes a first feedback parameter, the first configuration parameter includes the first feedback parameter of the UE; and/or when the first parameter includes a first feedback parameter and a time span between a time of receiving the downlink data and a time of expiry of the TAT, the first configuration parameter includes the first feedback parameter and/or a first time span threshold corresponding to the time span; and/or when the first parameter includes a moving speed of the UE, the first configuration parameter includes the moving speed of the UE and/or a moving speed threshold; and/or when the first parameter includes a TAT running duration type, the first configuration parameter includes the TAT running duration type; and/or when the first parameter includes whether to use the TAT, the first configuration parameter includes whether to use the TAT.

With reference to the fifth aspect, and/or the first possible implementation manner, and/or the second possible implementation manner, in a third possible implementation manner, the apparatus further includes:

a second receiving unit, configured to: after the TAT of the UE expires, receive first information that is sent by the UE by using a reserved first resource, where the first resource is reserved when the UE determines that a second parameter satisfies a second uplink synchronization maintenance condition.

With reference to the fifth aspect, and/or the first possible implementation manner, and/or the second possible implementation manner, and/or the third possible implementation manner, in a fourth possible implementation manner, the apparatus further includes:

a second sending unit, configured to send a second configuration parameter to the UE before the first information is received, where the second configuration parameter is a parameter required for the UE to determine whether the second parameter satisfies the second uplink synchronization maintenance condition.

With reference to the fifth aspect, and/or the first possible implementation manner, and/or the second possible implementation manner, and/or the third possible implementation manner, and/or the fourth possible implementation manner, in a fifth possible implementation manner, when the second parameter includes a first resource reservation parameter, the second configuration parameter includes the first resource reservation parameter; and/or when the second parameter includes a moving speed of the UE, the second configuration parameter includes the moving speed of the UE and/or a moving speed threshold; and/or when the second parameter includes a TAT running duration type, the second configuration parameter includes the TAT running duration type; and/or when the second parameter includes whether to use the TAT, the second configuration parameter includes whether to use the TAT.

With reference to the fifth aspect, and/or the first possible implementation manner, and/or the second possible implementation manner, and/or the third possible implementation manner, and/or the fourth possible implementation manner, and/or the fifth possible implementation manner, in a sixth possible implementation manner, the apparatus further includes:

a random access unit, configured to execute a random access procedure with the UE after the second sending unit sends the second configuration parameter to the UE and before the second receiving unit receives the first information, so that the UE obtains uplink synchronization.

With reference to the fifth aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the apparatus further includes:

a third sending unit, configured to send a handover command message to the UE in a handover procedure, where the handover command message includes configuration information of the first resource, and the configuration information is sent by a target base station; and a third receiving unit, configured to receive the first information that is sent by the UE according to the handover command message by using the first resource configured according to the configuration information.

With reference to the fifth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, the apparatus further includes:

a fourth sending unit, configured to send a broadcast message to the UE, where the broadcast message includes the configuration information of the first resource; and a fourth receiving unit, configured to receive the first information that is sent by the UE during initial access or access reestablishment by using the first resource configured according to the configuration information.

With reference to the fifth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, the first resource includes an SR resource, and correspondingly, the first information includes an SR; and/or the first resource includes a CQI resource, and correspondingly, the first information includes a CQI; and/or the first resource includes a PMI resource, and correspondingly, the first information includes a PMI; and/or the first resource includes an RI resource, and correspondingly, the first information includes an RI; and/or the first resource includes an SRS resource, and correspondingly, the first information includes an SRS.

With reference to the fifth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, the apparatus further includes:

a fifth sending unit, configured to send an aperiodic CQI reporting instruction to the UE when the first parameter of the UE satisfies the first uplink synchronization maintenance condition and/or in a period in which the first resource is reserved; and a fifth receiving unit, configured to receive an aperiodic CQI report of the UE in a resource that is scheduled in advance for the current aperiodic CQI reporting.

With reference to the fifth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, the apparatus further includes:

a sixth sending unit, configured to send an aperiodic SRS reporting instruction to the UE when the first parameter of the UE satisfies the first uplink synchronization maintenance condition and/or in a period in which the first resource is reserved; and a sixth receiving unit, configured to receive an aperiodic SRS report of the UE in a resource that is scheduled in advance for the current aperiodic SRS reporting.

With reference to the fifth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, in a twelfth possible implementation manner, the first configuration parameter and/or the second configuration parameter are/is sent to the UE by using an RRC message or a MAC-layer message or a physical-layer message.

According to a sixth aspect, an eNB is provided, including a radio transmitter and a radio receiver, where:

the radio transmitter is configured to send downlink data to a UE after a TAT of the UE expires; and the radio receiver is configured to receive a feedback that is sent by the UE with respect to the downlink data, where the feedback is sent by the UE when the UE determines that a first parameter satisfies a first uplink synchronization maintenance condition.

With reference to the sixth aspect, in a first possible implementation manner, the radio transmitter is further configured to: before sending the downlink data to the UE, send a first configuration parameter to the UE, where the first configuration parameter is a parameter required for the UE to determine whether the first parameter satisfies the first uplink synchronization maintenance condition.

With reference to the sixth aspect, and/or the first possible implementation manner, in a second possible implementation manner, when the first parameter includes a first feedback parameter, the first configuration parameter includes the first feedback parameter of the UE; and/or when the first parameter includes a first feedback parameter and a time span between a time of receiving the downlink data and a time of expiry of the TAT, the first configuration parameter includes the first feedback parameter and/or a first time span threshold corresponding to the time span; and/or when the first parameter includes a moving speed of the UE, the first configuration parameter includes the moving speed of the UE and/or a moving speed threshold; and/or when the first parameter includes a TAT running duration type, the first configuration parameter includes the TAT running duration type; and/or when the first parameter includes whether to use the TAT, the first configuration parameter includes whether to use the TAT.

With reference to the sixth aspect, and/or the first possible implementation manner, and/or the second possible implementation manner, in a third possible implementation manner, the radio receiver is further configured to: after the TAT of the UE expires, receive first information that is sent by the UE by using a reserved first resource, where the first resource is reserved when the UE determines that a second parameter satisfies a second uplink synchronization maintenance condition.

With reference to the sixth aspect, and/or the first possible implementation manner, and/or the second possible implementation manner, and/or the third possible implementation manner, in a fourth possible implementation manner, the radio transmitter is further configured to send a second configuration parameter to the UE before the first information is received, where the second configuration parameter is a parameter required for the UE to determine whether the second parameter satisfies the second uplink synchronization maintenance condition.

With reference to the sixth aspect, and/or the first possible implementation manner, and/or the second possible implementation manner, and/or the third possible implementation manner, and/or the fourth possible implementation manner, in a fifth possible implementation manner, when the second parameter includes a first resource reservation parameter, the second configuration parameter includes the first resource reservation parameter; and/or when the second parameter includes a moving speed of the UE, the second configuration parameter includes the moving speed of the UE and/or a moving speed threshold; and/or when the second parameter includes a TAT running duration type, the second configuration parameter includes the TAT running duration type; and/or when the second parameter includes whether to use the TAT, the second configuration parameter includes whether to use the TAT.

With reference to the sixth aspect, and/or the first possible implementation manner, and/or the second possible implementation manner, and/or the third possible implementation manner, and/or the fourth possible implementation manner, and/or the fifth possible implementation manner, in a sixth possible implementation manner, the radio receiver is further configured to execute a random access procedure with the UE after the second configuration parameter is sent to the UE and before the first information is received, so that the UE obtains uplink synchronization.

With reference to the sixth aspect, and/or the first possible implementation manner, and/or the second possible implementation manner, and/or the third possible implementation manner, and/or the fourth possible implementation manner, and/or the fifth possible implementation manner, and/or the sixth possible implementation manner, in a seventh possible implementation manner, the radio transmitter is further configured to send a handover command message to the UE in a handover procedure, where the handover command message includes configuration information of the first resource, and the configuration information is sent by a target base station; and the radio receiver is further configured to receive the first information that is sent by the UE according to the handover command message by using the first resource configured according to the configuration information.

With reference to the sixth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, in an eighth possible implementation manner, the radio transmitter is further configured to send a broadcast message to the UE, where the broadcast message includes the configuration information of the first resource; and the radio receiver is further configured to receive the first information that is sent by the UE during initial access or access reestablishment by using the first resource configured according to the configuration information.

With reference to the sixth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, in a ninth possible implementation manner, the first resource includes an SR resource, and correspondingly, the first information includes an SR; and/or the first resource includes a CQI resource, and correspondingly, the first information includes a CQI; and/or the first resource includes a PMI resource, and correspondingly, the first information includes a PMI; and/or the first resource includes an RI resource, and correspondingly, the first information includes an RI; and/or the first resource includes an SRS resource, and correspondingly, the first information includes an SRS.

With reference to the sixth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, in a tenth possible implementation manner, the radio transmitter is further configured to send an aperiodic CQI reporting instruction to the UE when the first parameter of the UE satisfies the first uplink synchronization maintenance condition and/or in a period in which the first resource is reserved; and the radio receiver is further configured to receive an aperiodic CQI report of the UE in a resource that is scheduled in advance for the current aperiodic CQI reporting.

With reference to the sixth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, in an eleventh possible implementation manner, the radio transmitter is further configured to send an aperiodic SRS reporting instruction to the UE when the first parameter of the UE satisfies the first uplink synchronization maintenance condition and/or in a period in which the first resource is reserved; and the radio receiver is further configured to receive an aperiodic SRS report of the UE in a resource that is scheduled in advance for the current aperiodic SRS reporting.

With reference to the sixth aspect, and/or the first possible implementation manner, and/or the second possible implementation manner, and/or the third possible implementation manner, and/or the fourth possible implementation manner, and/or the fifth possible implementation manner, and/or the sixth possible implementation manner, and/or the seventh possible implementation manner, and/or the eighth possible implementation manner, and/or the ninth possible implementation manner, and/or the tenth possible implementation manner, and/or the eleventh possible implementation manner, in a twelfth possible implementation manner, the first configuration parameter and/or the second configuration parameter are/is sent to the UE by using an RRC message or a MAC-layer message or a physical-layer message.

In the embodiments of the present invention, when downlink data is received after a TAT expires, a UE determines whether a first parameter satisfies a first uplink synchronization maintenance condition; and if the first parameter satisfies the first uplink synchronization maintenance condition, the UE directly sends, to a base station, a feedback corresponding to the downlink data; or if the first parameter does not satisfy the first uplink synchronization maintenance condition, the UE does not send, to the base station, the feedback corresponding to the downlink data. In the embodiments of the present invention, when a preset parameter of the UE satisfies an uplink synchronization maintenance condition, the UE can directly send, to the base station, the feedback corresponding to the downlink data. thereby avoiding a waste of transmission resources caused by multiple times of downlink data retransmission caused when the UE cannot feed back, and also avoiding an additional delay and signaling overhead caused by execution of random access.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1A:
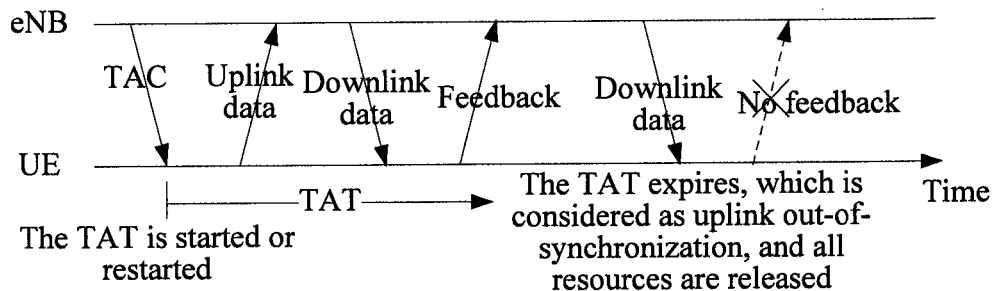
FIG. 1A is a schematic diagram of a method for data transmission according to the prior art.

In the prior art, a data processing procedure in a UE is shown in FIG. 1A. If a TAT is running, it is considered that the UE is in an uplink in-sync state and can normally send uplink data and feed back with respect to received downlink data; if the TAT is not running, including expiry of the TAT, or if the TAT is not started yet, for example, when the UE performs initial access or access reestablishment or is handed over to a target base station, it is considered that the UE is in an uplink out-of-sync state and the UE cannot send uplink data and feed back with respect to downlink data.

When the TAT is not started, the eNB may send a TAC (Timing Advance Command, timing advance command) to the UE by performing a random access procedure, so that the UE is in the uplink in-sync state and meanwhile starts the TAT of the UE. When the TAT is running, the eNB may also send a TAC to the UE to perform time alignment, maintain uplink synchronization of the UE, and meanwhile restart the TAT, and record an uplink synchronization time of the UE again.

Generally, when the UE receives the TAC, the UE needs to complete the following procedure:

(1) applying the received TAC; and (2) starting or restarting the TAT.

When the TAT expires, the UE needs to complete the following procedure:

(1) flushing all HARQ (Hybrid Automatic Repeat Request, Hybrid Automatic Repeat Request) buffers;

(2) notifying an RRC to release a PUCCH (Physical Uplink Control Channel, physical uplink control channel)/SRS (Sounding Reference Signal, sounding reference signal) resource, where the PUCCH resource includes an SR (Scheduling Request, scheduling request) resource, a CQI (Channel Quality Indicator, channel quality indicator) resource, a PMI (Precoding Matrix Indicator, precoding matrix indicator) resource, and an RI (Rank Indicator, rank indicator) resource; and (3) releasing all configured downlink resource allocations and uplink resource grants.

When the UE is in the uplink in-sync state, the UE always occupies a resource such as an PUCCH or an SRS. The eNB may send a TAC to the UE at intervals to maintain the uplink in-sync state. However, if an amount of data transmitted between the eNB and the UE is small or a transmission interval is large, to reduce resource occupancy of the UE, generally the eNB may select to no longer send a TAC to the UE to maintain uplink synchronization of the UE; after the TAT of the UE expires, the UE changes to an uplink out-of-sync state.

After the TAT expires, if the eNB needs to send downlink data, the eNB needs to notify the UE in advance to execute a random access procedure to obtain uplink synchronization, and then sends the downlink data to the UE. The UE sends, to the eNB, a feedback with respect to the downlink data after receiving the downlink data; or when the UE needs to transmit uplink data to the eNB, the UE also needs to first execute a random access procedure, and then transmit the uplink data after the UE obtains uplink synchronization.

After the TAT in the UE expires, because the UE needs to first execute the random access procedure, an additional delay and signaling overhead are caused. In addition, after the TAT in the UE expires, caused when the UE cannot send the feedback with respect to the downlink data, the eNB may be caused to retransmit the downlink data for multiple times, which wastes downlink data transmission resources between the eNB and the UE.

In view of this, embodiments of the present invention provide a method, an apparatus, and a terminal for data transmission, which can avoid a waste of transmission resources caused by multiple times of downlink data retransmission by an eNB caused when the UE cannot feed back after a TAT expires, and also avoid an additional delay and signaling overhead caused by execution of a random access procedure.

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

Figure 1B:
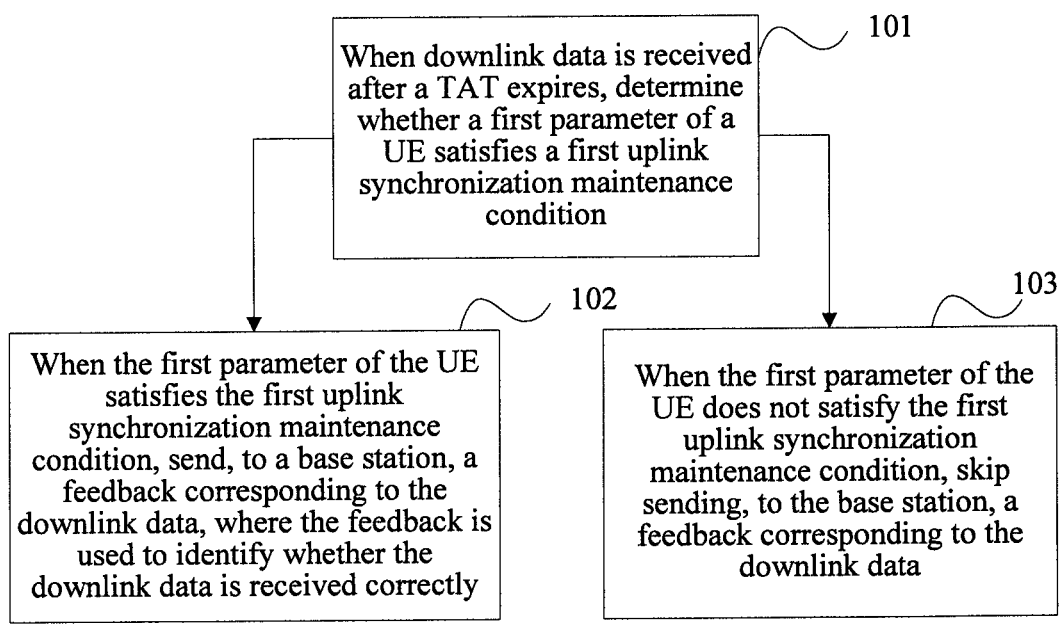
FIG. 1B is a schematic diagram of a first embodiment of a method for data transmission according to the present invention.

Referring to FIG. 1B, FIG. 1B is a schematic diagram of a first embodiment of a method for data transmission according to the present invention. The method is applicable to a UE. The method includes:

Step 101: When downlink data is received after a TAT expires, determine whether a first parameter of a UE satisfies a first uplink synchronization maintenance condition.

The first uplink synchronization maintenance condition is used to determine that the UE still maintains an uplink in-sync state after the TAT expires.

Generally, after the TAT expires, it is considered that the UE is already in an uplink out-of-sync state. However, actually, in some specific scenarios, although the TAT expires, it may still be considered that the UE maintains the uplink in-sync state and that uplink out-of-synchronization does not occur yet. In this case, the UE may be configured to feed back with respect to the received downlink data. The operation of determining, by the UE, whether a first parameter satisfies a first uplink synchronization maintenance condition is used to determine that the UE still maintains the uplink in-sync state although the TAT already expires.

The determining whether a first parameter of a UE satisfies a first uplink synchronization maintenance condition may be implemented in the following manners:

Manner 1: After receiving the downlink data, the UE determines, according to the first parameter of the UE, whether the first parameter of the UE satisfies the first uplink synchronization maintenance condition.

Manner 2: Before receiving the downlink data, or before the TAT expires, or when the UE receives a preset parameter, the UE determines whether the first parameter of the UE satisfies the first uplink synchronization maintenance condition, and stores a result of the determining. In this case, the determining whether a first parameter of a UE satisfies a first uplink synchronization maintenance condition in this step may include: acquiring the result of the determining, and determining, according to the result of the determining, whether the first parameter of the UE satisfies the first uplink synchronization maintenance condition.

The first parameter may include but is not limited to a first feedback parameter, and/or a first feedback parameter and a time span between a time of receiving the downlink data and a time of expiry of the TAT, and/or a moving speed of the UE, and/or a TAT running duration type, and/or configuration about whether to use the TAT, and the like. The first feedback parameter is used to indicate whether the UE feeds back with respect to the downlink data after the TAT expires, and the TAT running duration type is used to indicate whether TAT running duration configured by an eNB for the UE is a conservative configuration.

(1) When the first parameter includes the first feedback parameter, the first uplink synchronization maintenance condition may be that the UE feeds back with respect to the downlink data after the TAT expires. In this case, the determining whether a first parameter of a UE satisfies a first uplink synchronization maintenance condition may include:

determining whether the first feedback parameter is that the UE feeds back with respect to the downlink data after the TAT expires; and if the first feedback parameter is that the UE may feed back with respect to the downlink data after the TAT expires, determining that the first parameter satisfies the first uplink synchronization maintenance condition; or if the first feedback parameter is that the UE cannot feed back with respect to the downlink data after the TAT expires, determining that the first parameter does not satisfy the first uplink synchronization maintenance condition.

(2) When the first parameter includes the first feedback parameter and the time span between the time of receiving the downlink data and the time of expiry of the TAT, the first uplink synchronization maintenance condition may include: that the UE may feed back with respect to the downlink data after the TAT expires, and a first time span threshold t1; and correspondingly, the determining whether a first parameter of a UE satisfies a first uplink synchronization maintenance condition may include:

determining whether the first feedback parameter is that the UE may feed back with respect to the downlink data after the TAT expires, and determining whether the time span between the time of receiving the downlink data and the time of expiry of the TAT is not greater than the first time span threshold t1; and if the first feedback parameter is that the UE may feed back with respect to the downlink data after the TAT expires, and the time span between the time of receiving the downlink data and the time of expiry of the TAT is not greater than the first time span threshold, determining that the first parameter satisfies the first uplink synchronization maintenance condition; otherwise, determining that the first parameter does not satisfy the first uplink synchronization maintenance condition.

In an actual application, the determining whether the time span between the time of receiving the downlink data and the time of expiry of the TAT is not greater than the first time span threshold t1 may be implemented in the following manner: when the TAT expires, setting a first timer T1 with running duration of t1 in the UE, and determining whether the first timer T1 expires when the downlink data is received; and if the first timer does not expire when the UE receives the downlink data, determining that the time span from the time of receiving the downlink data to the time of expiry of the TAT is not greater than the first time span threshold t1, or otherwise, determining that the duration from the time of receiving the downlink data to the time of expiry of the TAT is greater than the first time span threshold t1.

In (1) and (2), the first feedback parameter and/or the first time span threshold T1 may be configured by the eNB for the UE by using an RRC (Radio Resource Control, radio resource control) message or a MAC (Media Access Control, media access control)-layer message or a physical-layer message. Specifically, the message carrying the first feedback parameter configured by the eNB for the UE may be implemented by adding an IE (information element, information element) to an existing message, for example, adding, to an existing RRC connection reconfiguration message, an IE in which the UE may feed back with respect to the downlink data after the TAT expires, or may be implemented by defining a new message, for example, designing a new RRC message or a MAC CE (Control Element, control element). When the first feedback parameter and/or the first time span threshold T1 is configured by the eNB for the UE, the configuration procedure occurs before step 101.

In addition, the eNB may configure the first feedback parameter based on information such as coverage of a cell is not greater than a coverage threshold, and/or the TAT running duration configured by the eNB for the UE is a conservative configuration, which is not described herein again.

(3) When the first parameter includes the moving speed of the UE, the first uplink synchronization maintenance condition may include that the moving speed of the UE is not greater than a moving speed threshold; and correspondingly, the determining whether a first parameter of a UE satisfies a first uplink synchronization maintenance condition may include: determining whether the moving speed of the UE is not greater than the moving speed threshold; and if the moving speed of the UE is not greater than the moving speed threshold, determining that the first parameter satisfies the first uplink synchronization maintenance condition; otherwise, determining that the first parameter does not satisfy the first uplink synchronization maintenance condition.

Preferably, the moving speed of the UE may be determined according to a quantity of cells that the UE passes through in a period of time, or the moving speed of the UE is measured by using a GPS. The moving speed of the UE may be determined by the eNB or the UE, which is not limited herein. When the moving speed of the UE is determined by the eNB, the eNB may configure the moving speed of the UE for the UE. The moving speed threshold may be prestored in the UE or may be configured by the eNB for the UE. A specific value of the moving speed threshold may be specifically set in an actual application, for example, set to 3 kilometers per hour, which is not limited herein.

When the moving speed and/or moving speed threshold of the UE is configured by the eNB, the eNB performs configuration for the UE by using an RRC message or a MAC-layer message or a physical-layer message. In addition, the message may be implemented by adding an IE (information element, information element) to an existing message, or may be implemented by defining a new message. When the moving speed and/or moving speed threshold of the UE is configured by the eNB for the UE, the configuration procedure occurs before step 101.

(4) When the first parameter includes the TAT running duration type, the TAT running duration type is used to indicate whether TAT running duration configured by the eNB for the UE is a conservative configuration. The first uplink synchronization maintenance condition may include that the TAT running duration configured by the eNB for the UE is a conservative configuration. In this case, the determining whether a first parameter of a UE satisfies a first uplink synchronization maintenance condition may include:

determining whether the TAT running duration type is a conservative configuration; and if the TAT running duration configured by the eNB for the UE is a conservative configuration, determining that the first parameter satisfies the first uplink synchronization maintenance condition; or if the TAT running duration configured by the eNB for the UE is not a conservative configuration, determining that the first parameter does not satisfy the first uplink synchronization maintenance condition.

If the eNB further reduces, when configuring the TAT running duration for the UE, duration on a basis of running duration calculated by the eNB, and configures a reduced TAT running duration for the UE, it may be considered that the TAT running duration configured by the eNB for the UE is a conservative configuration, and the eNB may configure the information for the UE. Specifically, how the eNB configures, for the UE, the information about whether the TAT running duration configured by the eNB for the UE is a conservative configuration, is not limited herein. Preferably, the eNB may configure the information for the UE by using an RRC message or a MAC-layer message or a physical-layer message. Specifically, a message carrying the information may be implemented by adding an IE (information element, information element) to an existing message or may be implemented by defining a new message. When the information is configured by the eNB for the UE, the configuration procedure occurs before step 101.

(5) When the first parameter includes whether to use the TAT, the first uplink synchronization maintenance condition may include that the UE does not use the TAT; in this case, the determining whether a first parameter of a UE satisfies a first uplink synchronization maintenance condition may include:

determining whether the first parameter is not to use the TAT; and if the first parameter is not to use the TAT, determining that the first parameter satisfies the first uplink synchronization maintenance condition; or if the first parameter is to use the TAT, or by default, that is, the UE is not configured to not use the TAT, determining that the first parameter does not satisfy the first uplink synchronization maintenance condition.

The eNB may configure whether the UE uses the TAT; when the eNB configures that the UE does not use the TAT, when the UE receives a TAC from the eNB, the TAT is not started, and surely, expiry does not occur, and the UE considers that the UE itself is always in the uplink in-sync state.

For details about how the eNB configures the parameter of whether the UE uses the TAT, reference may be made to the method for configuring the first feedback parameter by the eNB, and details are not described herein again.

Step 102: When the first parameter of the UE satisfies the first uplink synchronization maintenance condition, send, to an eNB, a feedback corresponding to the downlink data, where the feedback is used to indicate whether the downlink data is received correctly.

Preferably, the eNB may also perform further time alignment according to arrival time of the feedback, for example, send a TAC to the UE for adjusting the TA of the UE.

In the prior art, when the TAT does not expire, it is considered that the UE is in an uplink in-sync state. When the downlink data is received, the UE may directly send, to the eNB, the feedback corresponding to the downlink data, and the eNB may receive the feedback correctly. If the TAT expires, it is considered that the UE is in an uplink out-of-sync state, and a direct feedback with respect to the downlink data cannot be performed. In step 101, it is already determined that the first parameter of the UE satisfies the first uplink synchronization maintenance condition, which indicates that the UE is actually still in an uplink in-sync state although the TAT of the UE expires. Therefore, in step 102, the UE sends a corresponding feedback to the eNB after receiving the downlink data, and the eNB can still receive the feedback correctly.

Step 103: When the first parameter of the UE does not satisfy the first uplink synchronization maintenance condition, skip sending, to the eNB, a feedback corresponding to the downlink data.

Preferably, in this embodiment of the present invention, in a case in which the TAT expires and the first parameter of the UE satisfies the first uplink synchronization maintenance condition, if an aperiodic CQI (Channel Quality Indicator, channel quality indicator) reporting instruction sent by the eNB is received, an aperiodic CQI is reported to the eNB in a resource that is scheduled by the eNB in advance for the current aperiodic CQI reporting. Therefore, if the eNB needs to send new downlink data, the eNB may acquire, before sending the data, downlink channel quality fed back by the UE.

Preferably, in this embodiment of the present invention, in a case in which the TAT expires and the first parameter of the UE satisfies the first uplink synchronization maintenance condition, if an aperiodic SRS (Sounding Reference Signal, sounding reference signal) reporting instruction sent by the eNB is received, an aperiodic SRS is reported to the eNB in a resource that is scheduled by the eNB in advance for the current aperiodic SRS reporting. Therefore, the eNB can acquire uplink channel quality.

Figure 1C:
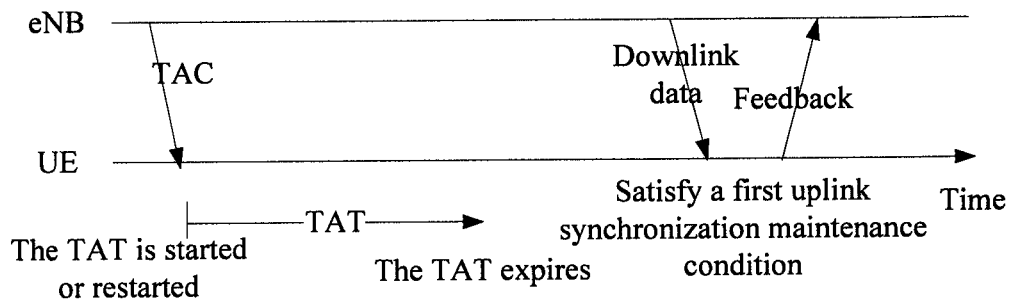
FIG. 1C is a first instance of the method for data transmission shown in FIG. 1B.

The method for data transmission shown in FIG. 1B may be further described by using an instance shown in FIG. 1C/1D.

Referring to FIG. 1C, when the first parameter includes the first feedback parameter, and/or the moving speed of the UE, and/or the TAT running duration type, when the first parameter satisfies the first uplink synchronization maintenance condition, there is no time limitation. Therefore, after the TAT expires, whenever the UE receives the downlink data, the UE may send the feedback with respect to the downlink data.

Figure 1D:
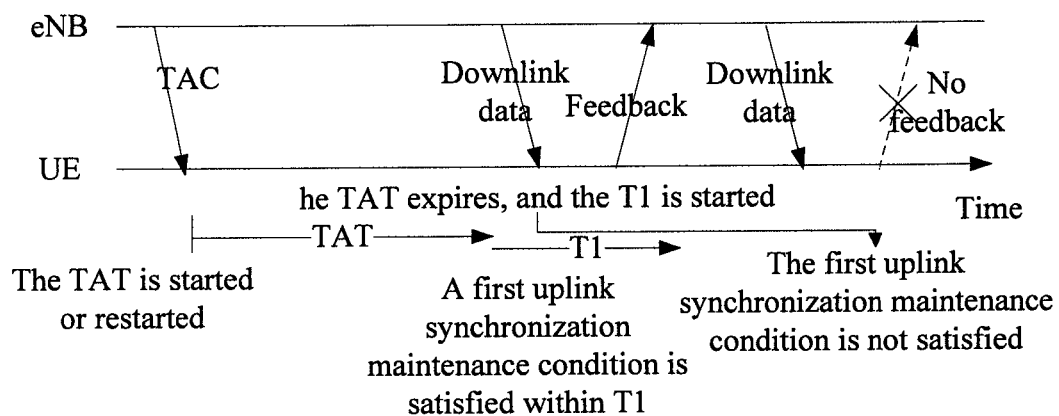
FIG. 1D is a second instance of the method for data transmission shown in FIG. 1B.

Referring to FIG. 1D, when the first parameter includes the first feedback parameter and the time span between the time of receiving the downlink data and the time of expiry of the TAT, the first parameter can satisfy the first uplink synchronization maintenance condition only within the time of the duration threshold T1. In this case, the UE may send the feedback with respect to the downlink data when receiving the downlink data within the time T1; and the UE does not send the feedback with respect to the downlink data when receiving the downlink data after the time T1.

It may be determined, by using the preset parameter of the UE, that the UE is still in the uplink in-sync state after the TAT expires, and therefore, the UE may send the feedback with respect to the downlink data when receiving the downlink data sent by the eNB.

In the method for data transmission shown in FIG. 1B, after a TAT expires, if downlink data is received, it is determined that a preset parameter of a UE satisfies an uplink synchronization maintenance condition, that is, it is determined that the UE still maintains an uplink in-sync state although the TAT expires; in this case, the UE may directly send, to an eNB, a feedback corresponding to the downlink data. Therefore, a problem that the eNB retransmits the downlink data for multiple times caused when the eNB cannot receive the feedback of the UE in a timely manner is solved, and downlink data transmission resources between the eNB and the UE are saved.

In addition, when the eNB has downlink data to send, the eNB does not need to notify the UE in advance to execute a random access procedure, and the UE still needs to execute a random access procedure with the eNB. Therefore, a signaling overhead between the UE and the eNB is reduced, and a delay caused by a random access procedure is eliminated.

Figure 2:
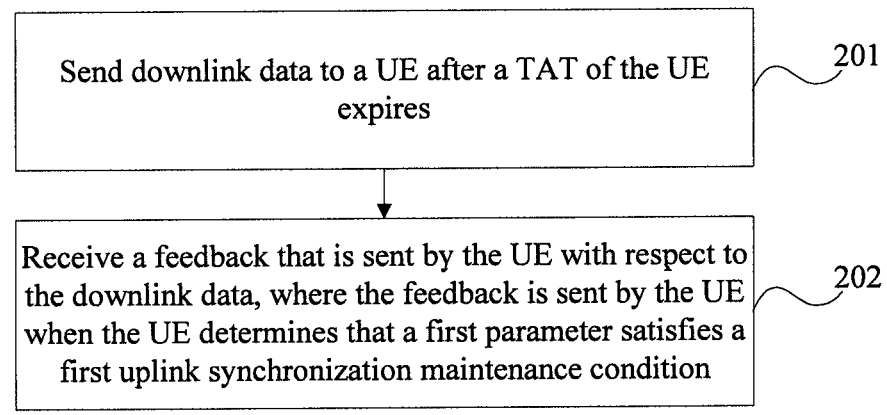
FIG. 2 is a schematic diagram of a second embodiment of a method for data transmission according to the present invention.

Referring to FIG. 2, FIG. 2 is a schematic diagram of a second embodiment of a method for data transmission according to the present invention. The embodiment shown in FIG. 2 may be applied to an eNB. The method includes:

Step 201: Send downlink data to a UE after a TAT of the UE expires.

Step 202: Receive a feedback that is sent by the UE with respect to the downlink data, where the feedback is sent by the UE when the UE determines that a first parameter satisfies a first uplink synchronization maintenance condition.

Preferably, before step 201, the method may further include:

sending a first configuration parameter to the UE, where the first configuration parameter is a parameter required for the UE to determine whether the first parameter satisfies the first uplink synchronization maintenance condition.

The eNB may send the configuration parameter to the UE by using an RRC message or a MAC-layer message or a physical-layer message. Specifically, the message carrying the first feedback parameter configured by the eNB for the UE may be implemented by adding an IE to an existing message, for example, adding, to an existing RRC connection reconfiguration message, an IE in which the UE may feed back with respect to the downlink data after the TAT expires, or may be implemented by defining a new message, for example, designing a new RRC message or a MAC CE.

When the first parameter includes a first feedback parameter, the first configuration parameter may include the first feedback parameter of the UE; and/or when the first parameter includes a first feedback parameter and a time span between a time of receiving the downlink data and a time of expiry of the TAT, the first configuration parameter may include the first feedback parameter and/or a first time span threshold t1 corresponding to the duration; and/or when the first parameter includes a moving speed of the UE, the first configuration parameter may include the moving speed of the UE and/or a moving speed threshold; and/or when the first parameter includes a TAT running duration type, the first configuration parameter may include the TAT running duration type; and/or when the first parameter includes whether to use the TAT, the first configuration parameter may include whether to use the TAT.

The method for data transmission shown in FIG. 2 cooperates with the method for data transmission shown in FIG. 1B to implement that the UE feeds back with respect to the downlink data sent by the eNB after the TAT expires.

Figure 3:
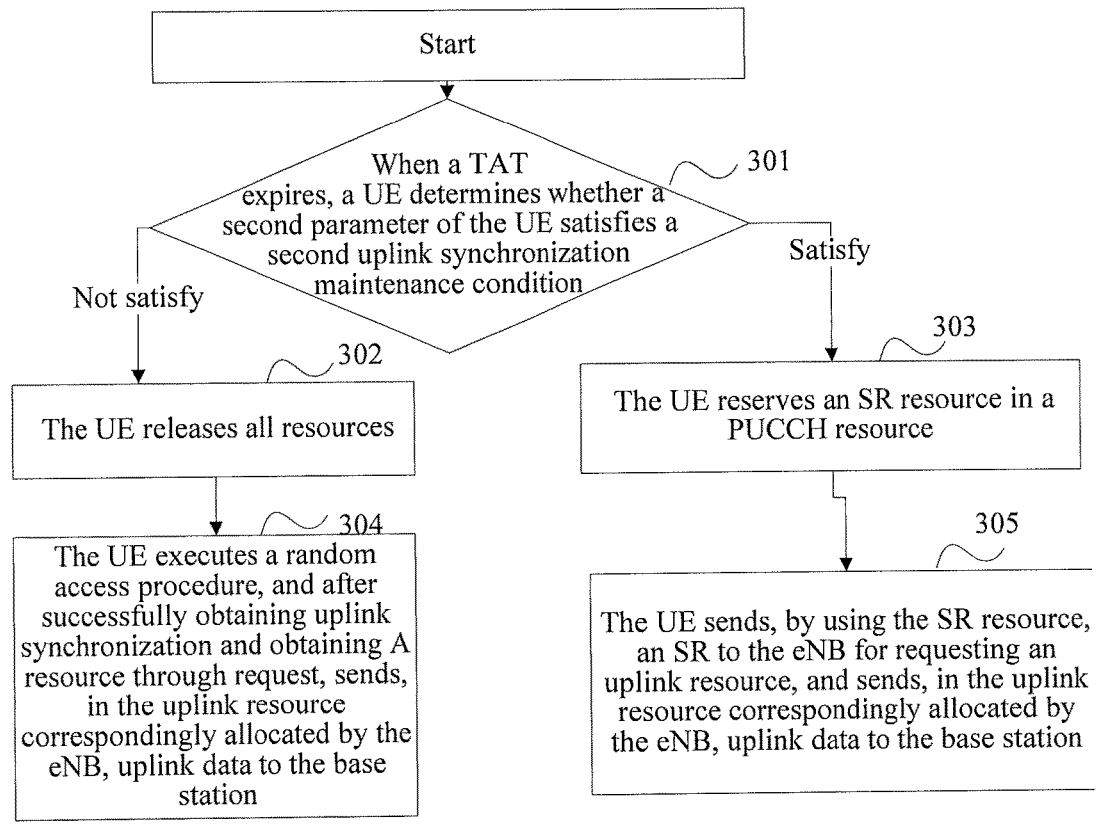
FIG. 3 is a schematic diagram of a third embodiment of a method for data transmission according to the present invention.

Referring to FIG. 3, FIG. 3 is a schematic diagram of a third embodiment of a method for data transmission according to the present invention. The embodiment shown in FIG. 3 may be executed on a basis of the first embodiment shown in FIG. 1B, or may be executed separately. As shown in FIG. 3, the method includes:

Step 301: When a TAT expires, a UE determines whether a second parameter of the UE satisfies a second uplink synchronization maintenance condition; if the second parameter of the UE does not satisfy the second uplink synchronization maintenance condition, executes step 302; or if the second parameter of the UE satisfies the second uplink synchronization maintenance condition, executes step 303.

The second uplink synchronization maintenance condition is used to determine that the UE still maintains an uplink in-sync state after the TAT expires.

The determining whether a second parameter of the UE satisfies a second uplink synchronization maintenance condition may be implemented in the following manners:

Manner 1: After receiving downlink data, the UE determines, according to the second parameter of the UE, whether the second parameter of the UE satisfies the second uplink synchronization maintenance condition.

Manner 2: Before the TAT expires, or when the UE receives a preset parameter, the UE determines whether the second parameter of the UE satisfies the second uplink synchronization maintenance condition, and stores a result of the determining. In this case, the determining whether a second parameter of the UE satisfies a second uplink synchronization maintenance condition in this step may include: acquiring the result of the determining, and determining, according to the result of the determining, whether the second parameter of the UE satisfies the second uplink synchronization maintenance condition.

The second parameter may include an SR resource reservation parameter, and/or a moving speed of the UE, and/or a TAT running duration type, and/or configuration about whether to use the TAT, and the like. The SR resource reservation parameter is used to indicate whether the UE reserves and uses an SR resource for sending an SR after the TAT expires. If the SR resource reservation parameter identifies that the UE reserves and uses the SR resource for sending the SR after the TAT expires, the UE may directly send the SR when the SR needs to be sent after the TAT expires, but does not need to first execute a random access procedure.

When the second parameter includes the moving speed of the UE, and/or the TAT running duration type, and/or configuration about whether to use the TAT, for details about implementation of the second uplink synchronization maintenance condition, reference may be made to implementation of the first uplink synchronization maintenance condition in step 101, and for details about implementation of determining whether the second parameter of the UE satisfies the second uplink synchronization maintenance condition, reference may be made to the corresponding description about determining whether the first parameter of the UE satisfies the first uplink synchronization maintenance condition in step 101, and details are not described herein again.

When the second parameter includes the SR resource reservation parameter, the second uplink synchronization maintenance condition may be that the UE reserves and uses the SR resource for sending the SR after the TAT expires; in this case, the determining whether the second parameter of the UE satisfies the second uplink synchronization maintenance condition may include: determining whether the SR resource reservation parameter is that the UE reserves and uses the SR resource after the TAT expires; and if the SR resource reservation parameter is that the UE reserves and uses the SR resource after the TAT expires, determining that the second parameter satisfies the second uplink synchronization maintenance condition; otherwise, determining that the second parameter does not satisfy the second uplink synchronization maintenance condition.

The SR resource reservation parameter may be configured by the eNB. For details about a specific configuration method, reference may be made the method for configuring the first parameter by the eNB in step 101, and details are not described herein again.

Optionally, the SR resource in this embodiment of the present invention may be configured when the eNB configures the second parameter, or may be configured separately, which is not limited herein.

In addition, the eNB may configure the SR resource reservation parameter based on information such as that coverage of a cell is not greater than a coverage threshold, and/or that the TAT running duration configured by the eNB for the UE is a conservative configuration, and details are not described herein again.

Step 302: The UE releases all resources; and when the UE has uplink data that needs to be sent and needs to send an SR, the UE executes step 304.

The releasing all resources may include at least one of the following:

(1) flushing all HARQ buffers;

(2) notifying an RRC to release configuration of a PUCCH/SRS; and (3) releasing all configured downlink resource allocations and uplink resource grants.

Step 303: The UE reserves an SR resource in a PUCCH resource; and when the UE has uplink data that needs to be sent and needs to send an SR, the UE executes step 305.

Preferably, the UE may release all resources except the SR resource.

Preferably, a reservation time t2 may be set for reservation of the SR resource, where the reservation time may be preset in the UE, or configured by the eNB for the UE. For details about a method for configuring the reservation time by the eNB, reference may be made to the method for configuring the second parameter by the eNB in step 301, and details are not described herein again.

When the reservation time t2 is set for reservation of the SR resource, a second timer T2 may be set in the UE; when it is determined that the second parameter satisfies the second uplink synchronization maintenance condition in step 301, the second timer T2 is started when the SR resource is reserved in step 303, and the SR resource is released when the second timer T2 expires. After the SR resource is released, when the UE needs to send uplink data, the UE needs to execute an operation in step 304.

Step 304: The UE executes a random access procedure, to successfully obtain uplink synchronization through the random access procedure and obtain a requested uplink resource through request, and sends, in the uplink resource correspondingly allocated by the eNB, the uplink data to the eNB. The current processing procedure ends.

When the UE has uplink data that needs to be sent, and a BSR (Buffer Status Reports, buffer status report) is triggered and no uplink resource is available, an SR needs to be sent to the eNB by using the SR resource, so as to request an uplink resource for transmitting the uplink data from the eNB. However, because no SR resource is available, the UE executes the random access procedure.

Step 305: The UE sends, by using the SR resource, an SR to the eNB for requesting an uplink resource, and sends, in the uplink resource correspondingly allocated by the eNB, the uplink data to the eNB. The current processing procedure ends.

When the UE has uplink data that needs to be sent, and a BSR is triggered and no uplink resource is available, the SR needs to be sent to the eNB by using the SR resource, so as to request an uplink resource for transmitting the uplink data from the eNB.

Preferably, when the UE needs to send uplink data after the TAT expires, before step 304 or step 305 is executed, the method may further include:

when the second parameter of the UE satisfies the second uplink synchronization maintenance condition, executing step 305; otherwise, performing step 304; or determining whether the SR resource is reserved; and if the SR resource is reserved, executing step 305; otherwise, executing step 304; or when the second timer is configured in the UE, determining whether the second timer expires; and if the second timer does not expire, executing step 305; or if the second timer expires, executing step 304.

Preferably, when this embodiment is used with the first embodiment, the second timer in this embodiment and the first timer in the first embodiment may be combined and implemented by using one timer. Correspondingly, after the TAT expires, within timing duration of the timer, the UE will always reserve and use the SR resource when uplink data needs to be sent, and will not release the SR resource until the timer expires; in addition, within the timing duration of the timer, if downlink data is received, a feedback with respect to the downlink data may be sent to the eNB. Alternatively, the second timer in this embodiment and the first timer in the first embodiment may be implemented by using one timer separately; and preferably, the running duration of the second timer is not greater than the running duration of the first timer.

Preferably, when this embodiment is used with the first embodiment, if the first parameter and the second parameter need to be configured by the eNB, the first parameter and the second parameter may be separately configured by the eNB, or may be uniformly configured by the eNB.

In addition, in this embodiment of the present invention, after the TAT expires and in a period in which the SR resource is reserved, if an aperiodic CQI (Channel Quality Indicator, channel quality indicator) reporting instruction sent by the eNB is received, an aperiodic CQI is reported to the eNB in a resource that is scheduled by the eNB in advance for the current aperiodic CQI reporting. Therefore, if the eNB needs to send new downlink data, the eNB may acquire downlink channel quality fed back by the UE.

In addition, in this embodiment of the present invention, after the TAT expires and in a period in which the SR resource is reserved, if an aperiodic SRS (Sounding Reference Signal, sounding reference signal) reporting instruction sent by the eNB is received, an aperiodic SRS is reported to the eNB in a resource that is scheduled by the eNB in advance for the current aperiodic SRS reporting. Therefore, the eNB can acquire uplink channel quality.

Figure 3A:
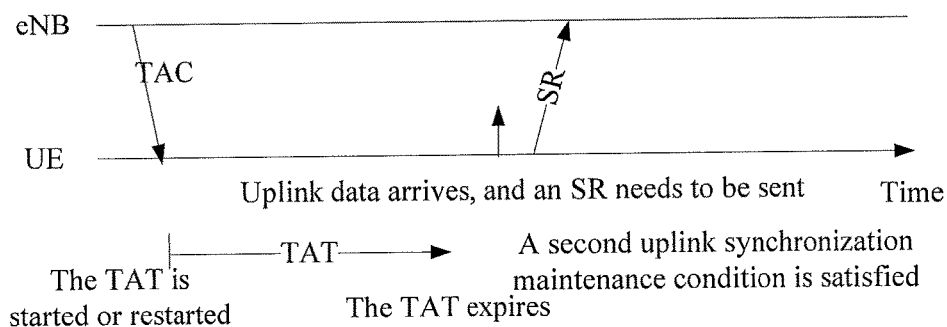
FIG. 3A is a first instance of the method for data transmission shown in FIG. 3.
Figure 3B:
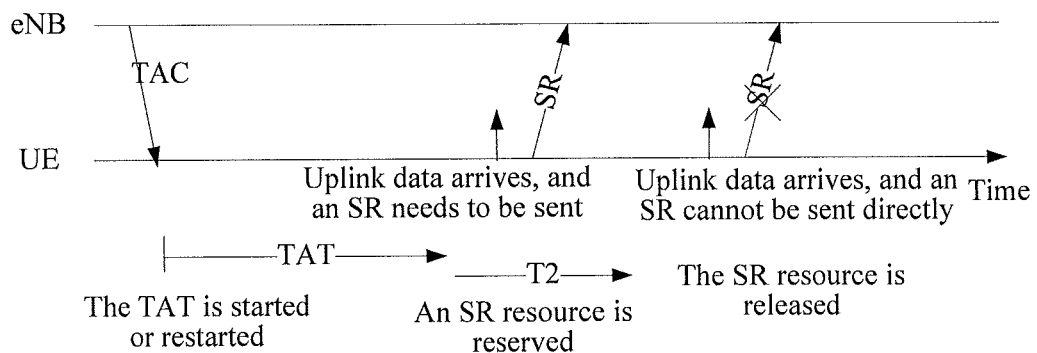
FIG. 3B is a second instance of the method for data transmission shown in FIG. 3.

FIG. 3A and FIG. 3B are data transmission instances of the method for data transmission shown in FIG. 3.

In FIG. 3A, the second timer is not set in the UE. In this case, after the TAT expires, an SR resource is always reserved. When the UE needs to send uplink data, the UE may directly use the SR resource to send an SR to request an uplink resource from the eNB for transmitting the uplink data.

In FIG. 3B, the second timer T2 is set in the UE. In this case, within the timing duration of the second timer, an SR resource is always reserved. If the UE needs to send uplink data, the UE may directly use the SR resource to send an SR to request an uplink resource from the eNB for transmitting the uplink data. When the second timer expires, the SR resource is released. If the UE needs to send uplink data, the UE cannot directly use the SR resource for sending the SR, but first executes a random access procedure, and after uplink synchronization is successfully obtained through the random access procedure and the uplink resource is obtained through request, sends the uplink data to the eNB.

Figure 3C:
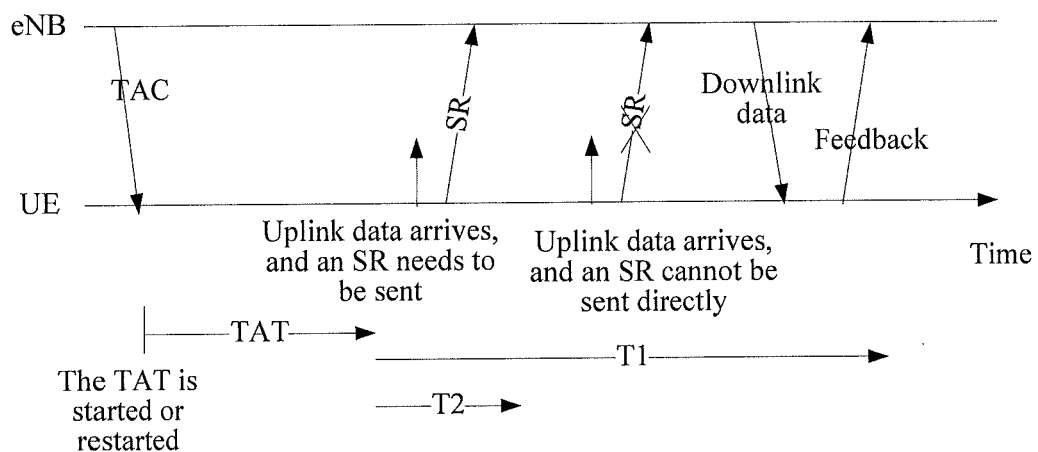
FIG. 3C is a third instance of the method for data transmission shown in FIG. 3.

FIG. 3C is a data transmission instance combining the first embodiment and the third embodiment. After the TAT expires, the first timer T1 and the second timer T2 are started separately, where the first timer T1 is corresponding to sending of a feedback with respect to downlink data, and the second timer T2 is corresponding to sending of uplink data.

Specifically, within the timing duration of the second timer T2, when the UE needs to send uplink data, the UE does not need to execute the random access procedure, but directly implements sending of uplink data by using the SR resource reserved by the UE, and can directly feed back with respect to the downlink data because it is within the timing duration of the timer T1. Within a period after the second timer T2 expires but the first timer T1 does not expire, a feedback with respect to the downlink data can still be performed. However, in this case, because the T2 already expires, when the UE needs to send uplink data, the UE can send the uplink data only after successfully obtaining uplink synchronization by executing the random access procedure; after the first timer T1 expires, when the UE needs to send uplink data, the UE needs to first successfully obtain uplink synchronization by executing the random access procedure, and cannot send the feedback with respect to the downlink data after receiving the downlink data.

In the embodiment of the method for data transmission shown in FIG. 3, when the TAT expires, the SR resource is reserved. Therefore, after the TAT expires, the UE does not need to execute the random access procedure to re-access the eNB, but directly requests an uplink resource from the eNB by using the SR resource, for transmitting the uplink data. Therefore, a signaling overhead between the UE and the eNB is reduced, a delay caused by a random access procedure is eliminated, and efficiency of uplink data transmission between the eNB and the UE is improved.

Preferably, the SR resource in the embodiment shown in FIG. 3 may be also replaced with another resource.

The reserved SR resource in step 303 may be replaced with a CQI resource. Correspondingly, the SR that needs to be sent in the third embodiment shown in FIG. 3 may be replaced with a CQI.

Alternatively, the reserved SR resource in step 303 may be replaced with a PMI resource. Correspondingly, the SR that needs to be sent in the third embodiment shown in FIG. 3 may be replaced with a PMI.

Alternatively, the reserved SR resource in step 303 may be replaced with an RI resource. Correspondingly, the SR that needs to be sent in the third embodiment shown in FIG. 3 may be replaced with an RI.

Alternatively, the reserved SR resource in step 303 may be replaced with an SRS resource. Correspondingly, the SR that needs to be sent in the third embodiment shown in FIG. 3 may be replaced with an SRS.

In specific implementation, one or more of the SR resource, CQI resource, PMI resource, RI resource, and SRS resource may be reserved simultaneously.

The SR resource, CQI resource, PMI resource, RI resource, and SRS resource may be collectively called a first resource. The SR, CQI, PMI, RI, and SRS may be collectively called first information.

In this embodiment, after a TAT expires, a first resource is reserved; after the TAT expires, a UE directly sends first information to an eNB by using the first resource; the UE does not need to execute a random access procedure to re-access the eNB, and the eNB also does not need to re-allocate the first resource to the UE. Therefore, a signaling overhead between the UE and the eNB may be reduced, and a delay caused by a random access procedure is eliminated.

Figure 4:
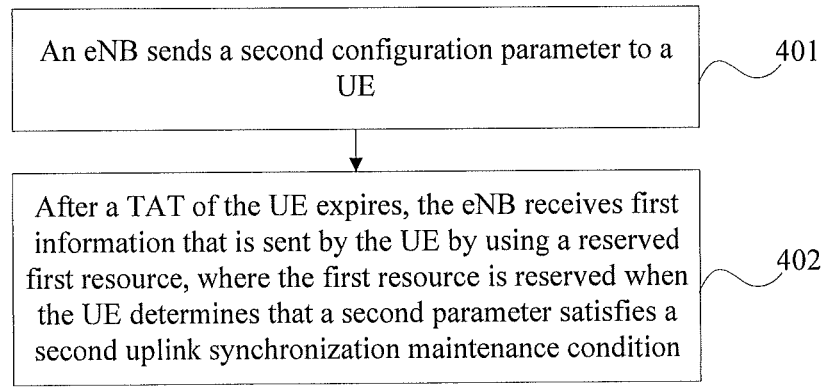
FIG. 4 is a schematic diagram of a fourth embodiment of a method for data transmission according to the present invention.

Referring to FIG. 4, FIG. 4 is a schematic diagram of a fourth embodiment of a method for data transmission according to the present invention. The method is applicable to an eNB. The method includes:

Step 401: An eNB sends a second configuration parameter to a UE, where the second configuration parameter is a parameter required for the UE to determine whether a second parameter satisfies a second uplink synchronization maintenance condition.

Step 401 is an optional step.

Step 402: After a TAT of the UE expires, the eNB receives first information that is sent by the UE by using a reserved first resource, where the first resource is reserved when the UE determines that the second parameter satisfies the second uplink synchronization maintenance condition.

When the second parameter includes a first resource reservation parameter, the second configuration parameter may include the first resource reservation parameter; and/or when the second parameter includes a moving speed of the UE, the second configuration parameter may include the moving speed of the UE and/or a moving speed threshold; and/or when the second parameter includes a TAT running duration type, the second configuration parameter may include the TAT running duration type; and/or when the second parameter includes whether to use the TAT, the second configuration parameter may include whether to use the TAT.

The method for data transmission shown in FIG. 4 may cooperate with the method for data transmission shown in FIG. 3 to implement sending of the first information in the UE after the TAT expires.

Preferably, between step 401 and step 402, the method may further include:

executing a random access procedure between the eNB and the UE after the TAT of the UE expires, so that the UE successfully obtains uplink synchronization.

Figure 5:
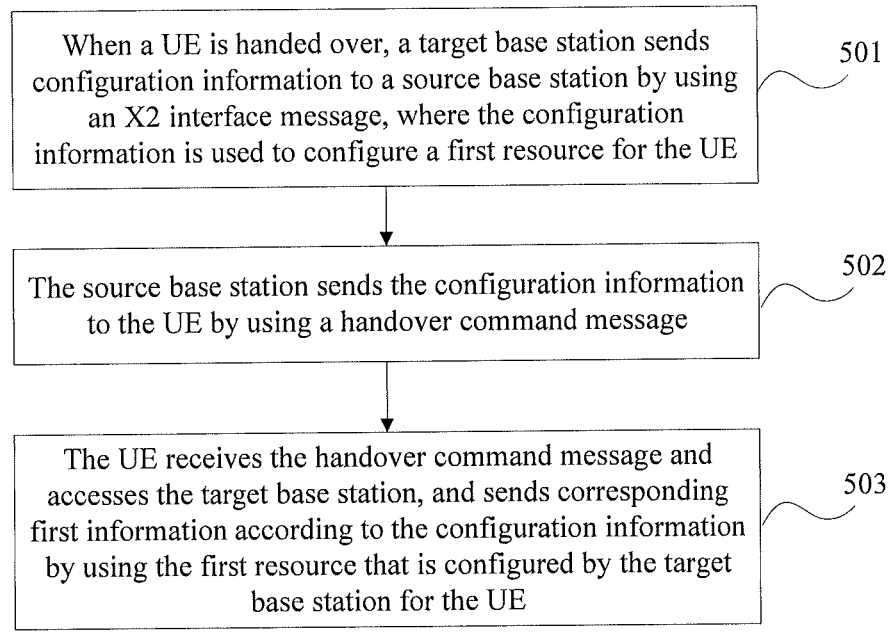
FIG. 5 is a schematic diagram of a fifth embodiment of a method for data transmission according to the present invention.

In this case, the method for data transmission shown in FIG. 4 may cooperate with a method for data transmission shown in FIG. 5 to implement sending of the first information in the UE after the TAT expires.

Referring to FIG. 5, FIG. 5 is a schematic diagram of a fifth embodiment of a method for data transmission according to the present invention. The method may be applied to a handover scenario in which a UE is handed over from a source base station to a target base station. The method includes:

Step 501: When a UE is handed over, a target base station sends configuration information to a source base station by using an X2 interface message, where the configuration information is used to configure a first resource for the UE.

The first resource may include: an SR resource, and/or a CQI resource, and/or a PMI resource, and/or an RI resource, and/or an SRS resource.

Various resources configured in the configuration information may be provided for the UE for use all the time.

Alternatively, the configuration information may further indicate duration for which the UE uses various first resources. Use duration of each first resource may be the same or different. In addition, a specific value of the use duration is not limited herein, and may be a specific numeric value, or may be default. When use duration of a first resource is default, it indicates that the UE may always use the first resource.

Alternatively, it may be further configured in the configuration information for the UE that the UE directly uses an SR resource instead of a random access procedure to accesses the target base station.

Step 502: The source base station sends the configuration information to the UE by using a handover command message.

Step 503: The UE receives the handover command message, and sends corresponding first information according to the configuration information by using the first resource that is configured by the target base station for the UE.

When the first resource includes the SR resource, the first information includes an SR. In this case, within use duration of the SR resource, when the UE has uplink data that needs to be sent, the UE sends the SR to the target base station by directly using the SR resource configured by the target base station for the UE, to request an uplink resource for sending the uplink data, without executing a random access procedure. Preferably, when the UE accesses the target base station, the UE sends the SR instead of executing random access to request the uplink resource for sending a handover complete message.

When the first resource includes the SR resource, and it is configured in the configuration information for the UE that the UE directly uses the SR resource instead of the random access procedure to access the target base station, the UE may use the SR resource to send the SR to the target base station, thereby accessing the target base station. Correspondingly, when the target base station receives, in the SR resource, the SR sent by the UE, the UE is allowed to access the target base station.

After allocating the SR resource to the UE, the target base station needs to receive the SR that is sent by the UE to the target base station by using the SR resource configured by the target base station, and allocates an uplink resource to the UE for the UE to send the uplink data, such as the handover complete message or other uplink data.

When the first resource includes the CQI resource, the first information includes a CQI. In this case, within use duration of the CQI resource, the UE may send the CQI by using the CQI resource configured by the target base station for the UE. When the first resource includes the PMI resource, RI resource, or SRS resource, a processing procedure is similar to that when the first resource includes the CQI resource, and details are not described herein again.

The fifth embodiment shown in FIG. 5 may be implemented in combination with one or more embodiments in the first to fourth embodiments, or may be implemented separately, which is not limited herein.

In the embodiment of the present invention shown in FIG. 5, when a UE is handed over, a target base station directly configures an SR resource, and/or a CQI resource, and/or a PMI resource, and/or an RI resource, and/or an SRS resource for the UE, so that after the UE is handed over to the target base station, the UE may directly use the configured resources to transmit corresponding information, without first executing a random access procedure to request a resource from the target base station. Therefore, a signaling overhead between the UE and the target base station is reduced, and a delay caused by a random access procedure is eliminated.

Figure 6:
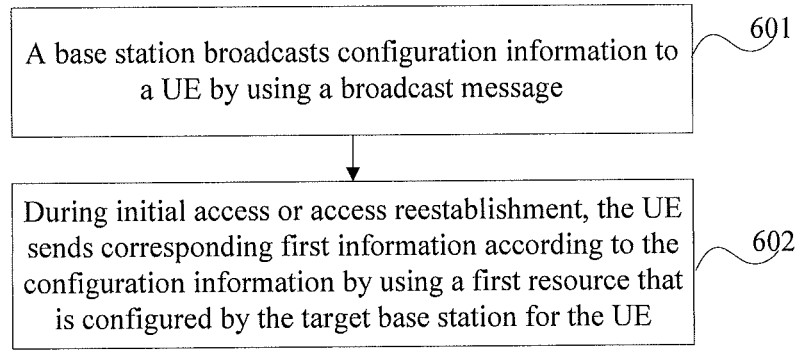
FIG. 6 is a schematic diagram of a sixth embodiment of a method for data transmission according to the present invention.

Referring to FIG. 6, FIG. 6 is a schematic diagram of a sixth embodiment of a method for data transmission according to the present invention. The method is applicable to an initial access scenario or an access reestablishment scenario of a UE. The method includes:

Step 601: An eNB broadcasts configuration information to a UE by using a broadcast message.

The configuration information is used to configure a first resource for the UE, where the first resource may include: an SR resource, and/or a CQI resource, and/or a PMI resource, and/or an RI resource, and/or an SRS resource.

Preferably, the configuration information may further indicate duration for which the UE uses various resources.

Use duration of each resource may be the same or different. In addition, a specific value of the use duration is not limited herein, and may be a specific numeric value, or may be default. When use duration of a resource is default, it indicates that the UE may always use the resource.

Step 602: During initial access or access reestablishment, the UE sends corresponding first information according to the configuration information by using a first resource that is configured by the eNB for the UE.

When the first resource includes the SR resource, the first information includes an SR. In this case, within use duration of the SR resource, when the UE has uplink data that needs to be sent, the UE sends the SR to the eNB by directly using the SR resource configured by the eNB for the UE, to request an uplink resource for sending the uplink data, without executing a random access procedure.

When the first resource includes the CQI resource, the first information includes a CQI. In this case, within use duration of the CQI resource, the UE may send the CQI by using the CQI resource configured by the eNB for the UE. A processing procedure when the first resource includes the PMI resource, RI resource, or SRS resource is similar to that when the first resource includes the CQI resource, and details are not described herein again.

It should be noted that, because the configuration information is sent by using a broadcast message, multiple UEs may simultaneously use the configured first resource in the configuration information to send the corresponding first information, which may cause a collision. In this case, the eNB needs to solve the collision, which is similar to the random access procedure, and details are not described herein again.

The sixth embodiment shown in FIG. 6 may be implemented in combination with one or more embodiments in the first to fifth embodiments, or may be implemented separately, which is not limited herein.

In the embodiment of the present invention shown in FIG. 6, an eNB configures an SR resource, and/or a CQI resource, and/or a PMI resource, and/or an RI resource, and/or an SRS resource for a UE, so that during initial access or access reestablishment, the UE may directly use the configured resources to transmit corresponding information, without first executing a random access procedure to request a resource from the eNB. Therefore, a signaling overhead between the UE and the eNB is reduced, and a delay caused by a random access procedure is eliminated.

Figure 7:
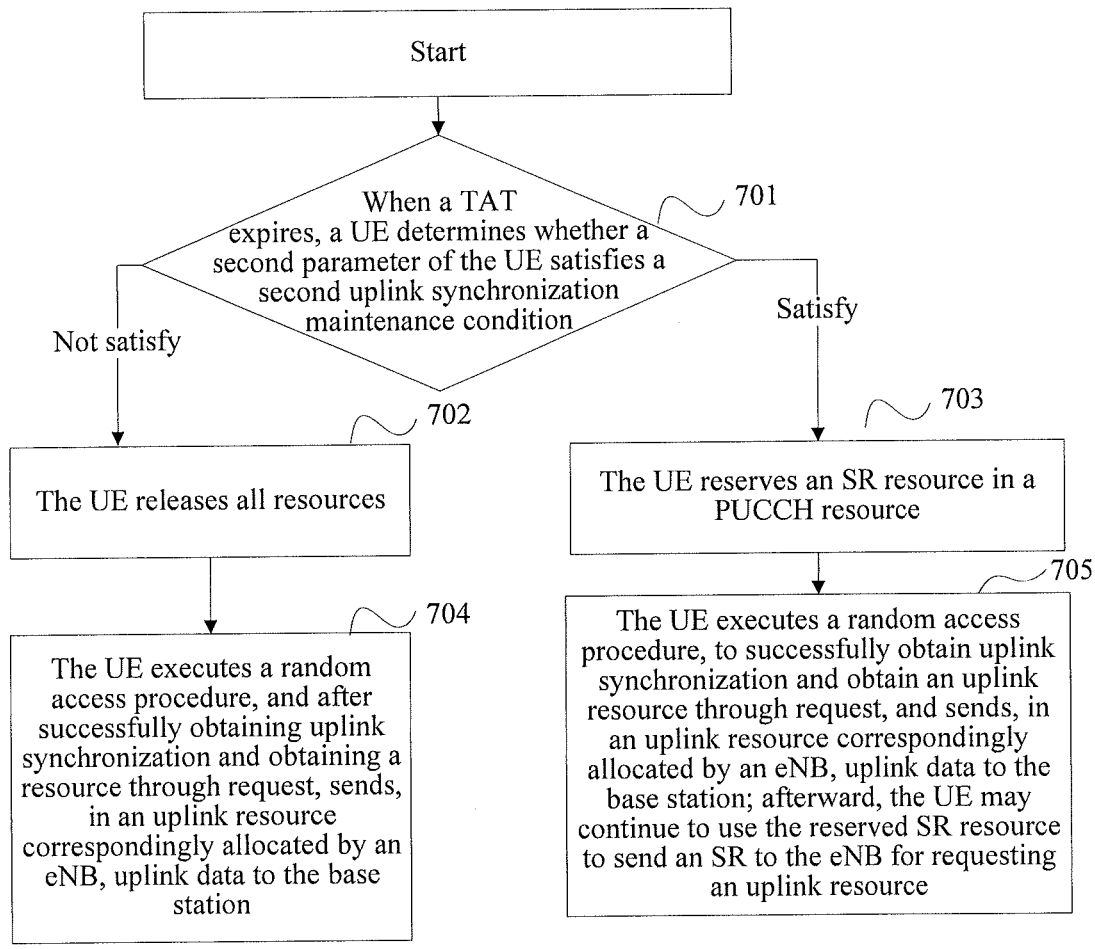
FIG. 7 is a schematic diagram of a seventh embodiment of a method for data transmission according to the present invention.

Referring to FIG. 7, FIG. 7 is a schematic diagram of a seventh embodiment of a method for data transmission according to the present invention. The method includes:

Step 701 to step 704 are the same as step 301 to step 304, and are not further described herein.

Step 705: The UE executes a random access procedure, to successfully obtain uplink synchronization through the random access procedure and obtain an uplink resource through request, and sends, in the uplink resource correspondingly allocated by the eNB, the uplink data to the eNB. Afterward, during running of the TAT, when the UE has uplink data that needs to be sent, the UE may continue to use a previously reserved SR resource to request an uplink resource from the eNB.

For other descriptions and exemplary implementation manners of the embodiment of the present invention, reference may be made to the third embodiment shown in FIG. 3, and details are not described one by one herein again.

Preferably, the SR resource in this embodiment may be also replaced with another resource.

The reserved SR resource in step 703 may be replaced with a CQI resource. Correspondingly, the SR that needs to be sent may be replaced with a CQI.

Alternatively, the reserved SR resource in step 703 may be replaced with a PMI resource. Correspondingly, the SR that needs to be sent may be replaced with a PMI.

Alternatively, the reserved SR resource in step 703 may be replaced with an RI resource. Correspondingly, the SR that needs to be sent may be replaced with an RI.

Alternatively, the reserved SR resource in step 703 may be replaced with an SRS resource. Correspondingly, the SR that needs to be sent may be replaced with an SRS.

Preferably, one or more of the SR resource, CQI resource, PMI resource, RI resource, and SRS resource may be reserved simultaneously. Correspondingly, when information corresponding to the reserved resource needs to be sent, the UE may send the information by using the reserved resource, without requiring the eNB to perform a reconfiguration.

In addition, in this embodiment, the eNB may instruct the UE in advance about whether to reserve the SR resource, CQI resource, PMI resource, RI resource, and SRS resource. The eNB may consider the resources as a whole, and instruct to simultaneously reserve or release the resources, or may separately instruct, with respect to each resource, whether to reserve the resource, which is not limited herein. The instruction about whether to reserve the resource may be configured by the eNB for the UE by using an RRC message or a MAC-layer message or a physical-layer message, where the message may be implemented by adding an IE to an existing message, or may be implemented by defining a new message.

The seventh embodiment shown in FIG. 7 may be implemented in combination with one or more embodiments in the first to sixth embodiments, or may be implemented separately, which is not limited herein.

In comparison with the third embodiment shown in FIG. 3, in this embodiment, the SR resource is reserved, but after the TAT expires, when the UE needs to send uplink data, the UE still needs to execute the random access procedure to obtain uplink synchronization (correspondingly, determining whether uplink synchronization needs to be obtained actually changes to determining whether the SR resource needs to be reserved); and if the eNB configures that the SR resource needs to be reserved, the UE reserves the SR resource after the TAT expires). However, in comparison with the prior art, in this embodiment, if the UE obtains uplink synchronization again, during uplink synchronization, for example, during re-running of the TAT, the UE may directly use the previously reserved SR resource to request the uplink resource, without requesting the SR resource from the eNB again. Therefore, in comparison with the prior art, a signaling overhead between the UE and the eNB is reduced.

In addition, in the embodiments of the present invention shown in FIG. 1B and FIG. 2 to FIG. 7, the method may further include: when the UE fails to access the eNB fails during execution of the random access procedure, stopping a started TAT, and stopping applying a TAC in a random access response received in the random access procedure. Generally, this means that the UE continues to apply a TAC preceding to the TAC in the random access response. It should be noted that, such processing may also be applied independent from the embodiments shown in FIG. 1B and FIG. 2 to FIG. 5.

In the random access procedure, the TAC is carried in the random access response sent by the eNB. If the UE restarts a TAT according to the TAC, but the UE does not successfully access the eNB after the UE executes the random access procedure, the TAT started according to the TAC needs to be stopped. However, in the prior art, the UE does not stop applying the TAC in the random access response. Because the random access fails, the TAC in the random access response is not intended for the UE, and the UE should not apply the TAC in the random access response. Otherwise, when the eNB re-sends downlink data or a TAC to the UE, regardless of whether the UE performs an uplink feedback, the UE applies the new TAC. Consequently, a problem of an uplink time alignment error occurs because an incorrect TAC is previously applied. Further, subsequent uplink sending may cause uplink interference, and the eNB also cannot receive uplink sending of the UE correctly. Therefore, in this embodiment of the present invention, stopping applying the TAC in the random access response received in the random access procedure can avoid the problem, and ensure that no problem occurs during subsequent uplink timing of the UE.

Corresponding to the foregoing methods, an embodiment of the present invention further provides an apparatus for data transmission.

Figure 8:
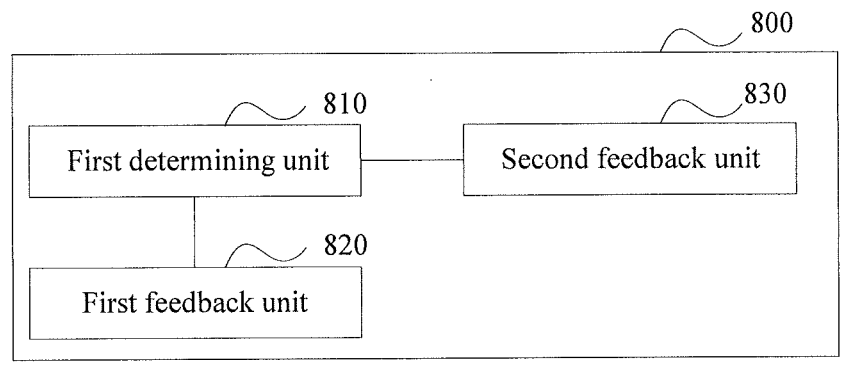
FIG. 8 is a schematic diagram of a first embodiment of an apparatus for data transmission according to the present invention.

Referring to FIG. 8, FIG. 8 is a schematic diagram of a first embodiment of an apparatus 800 for data transmission according to the present invention. The apparatus for data transmission is applicable to a UE. The apparatus 800 for data transmission includes:

a first determining unit 810, configured to: when downlink data is received after a TAT expires, determine whether a first parameter of a UE satisfies a first uplink synchronization maintenance condition;

a first feedback unit 820, configured to: when the first determining unit 810 determines that the first parameter of the UE satisfies the first uplink synchronization maintenance condition, send, to an eNB, a feedback corresponding to the downlink data, where the feedback is used to indicate whether the downlink data is received correctly, and the first synchronization maintenance condition is used to determine that the UE still maintains an uplink in-sync state after the TAT expires; and a second feedback unit 830, configured to: when the first determining unit 810 determines that the first parameter of the UE does not satisfy the first uplink synchronization maintenance condition, skip sending, to the eNB, the feedback corresponding to the downlink data.

Preferably, the first determining unit 810 may be specifically configured to:

determine, according to the first parameter of the UE, whether the first parameter of the UE satisfies the first uplink synchronization maintenance condition; or predetermine whether the first parameter of the UE satisfies the first uplink synchronization maintenance condition, and store a result of the determining; and acquire the result of the determining, and determine, according to the result of the determining, whether the first parameter of the UE satisfies the first uplink synchronization maintenance condition.

Preferably, the first parameter may include a first feedback parameter, and the first feedback parameter is used to indicate whether the UE feeds back with respect to the downlink data after the TAT expires; and the first determining unit 810 may be specifically configured to determine, in the following manner, whether the first parameter of the UE satisfies the first uplink synchronization maintenance condition: determining whether the first feedback parameter is that the UE feeds back with respect to the downlink data after the TAT expires; and/or the first parameter may include a first feedback parameter and a time span between a time of receiving the downlink data and a time of expiry of the TAT; and the first determining unit 810 may be specifically configured to determine, in the following manner, whether the first parameter of the UE satisfies the first uplink synchronization maintenance condition: determining whether the first feedback parameter is that the UE feeds back with respect to the downlink data after the TAT expires, and determining whether the time span between the time of receiving the downlink data and the time of expiry of the TAT is not greater than a first time span threshold; and/or the first parameter may include a moving speed of the UE; and the first determining unit 810 may be specifically configured to determine, in the following manner, whether the first parameter of the UE satisfies the first uplink synchronization maintenance condition: determining whether the moving speed of the UE is not greater than a moving speed threshold; and/or the first parameter may include a TAT running duration type; and the first determining unit 810 may be specifically configured to determine, in the following manner, whether the first parameter of the UE satisfies the first uplink synchronization maintenance condition: determining whether the TAT running duration type is a conservative configuration; and/or the first parameter may include whether to use the TAT; and the first determining unit 810 may be specifically configured to determine, in the following manner, whether the first parameter of the UE satisfies the first uplink synchronization maintenance condition: determining whether the first parameter is not to use the TAT.

In the apparatus for data transmission shown in FIG. 8, after a TAT expires, if downlink data is received, it is determined that a first parameter of a UE satisfies a first uplink synchronization maintenance condition, that is, it is determined that the UE still maintains an uplink in-sync state although the TAT expires; in this case, a feedback corresponding to the downlink data is directly sent to an eNB without executing a random access procedure, and therefore the feedback is sent to the eNB in a timely manner. Therefore, a problem that the eNB retransmits the downlink data for multiple times caused when the eNB cannot receive the feedback of the UE in a timely manner is solved, and downlink data transmission resources between the eNB and the UE are saved.

In addition, because the random access procedure does not need to be executed between the UE and the eNB, a signaling overhead between the UE and the eNB is reduced, a delay caused by a random access procedure is eliminated, and efficiency of data transmission between the eNB and the UE is improved.

Figure 9:
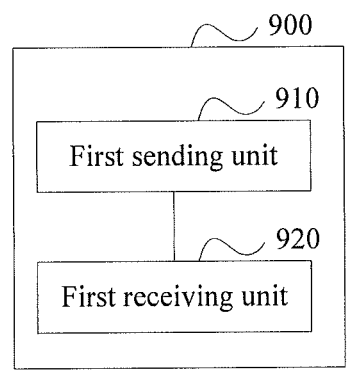
FIG. 9 is a schematic diagram of a second embodiment of an apparatus for data transmission according to the present invention.

Referring to FIG. 9, FIG. 9 is a schematic diagram of a second embodiment of an apparatus 900 for data transmission according to the present invention. The apparatus is applicable to an eNB. The apparatus 900 includes:

a first sending unit 910, configured to send downlink data to a UE after a TAT of the UE expires; and a first receiving unit 920, configured to receive a feedback that is sent by the UE with respect to the downlink data sent by the first sending unit, where the feedback is sent by the UE when the UE determines that a first parameter satisfies a first uplink synchronization maintenance condition.

Preferably, the first sending unit 910 may be further configured to: before sending the downlink data to the UE, send a first configuration parameter to the UE, where the first configuration parameter is a parameter required for the UE to determine whether the first parameter satisfies the first uplink synchronization maintenance condition.

Preferably, when the first parameter includes a first feedback parameter, the first configuration parameter may include the first feedback parameter of the UE; and/or when the first parameter includes a first feedback parameter and a time span between a time of receiving the downlink data and a time of expiry of the TAT, the first configuration parameter may include the first feedback parameter and/or a first time span threshold corresponding to the time span; and/or when the first parameter includes a moving speed of the UE, the first configuration parameter may include the moving speed of the UE and/or a moving speed threshold; and/or when the first parameter includes a TAT running duration type, the first configuration parameter may include the TAT running duration type; and/or when the first parameter includes whether to use the TAT, the first configuration parameter may include whether to use the TAT.

The apparatus shown in FIG. 9 may cooperate with the apparatus shown in FIG. 8 to implement the reception and feedback of downlink data between the UE and the eNB after the TAT expires.

Figure 10:
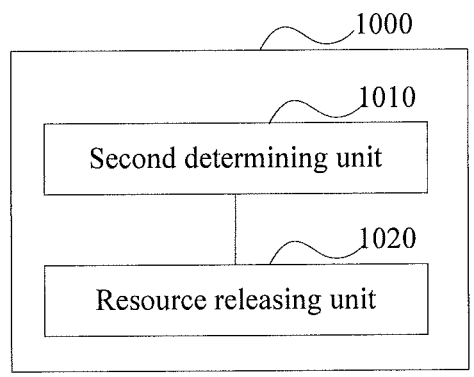
FIG. 10 is a schematic diagram of a third embodiment of an apparatus for data transmission according to the present invention.

Referring to FIG. 10, FIG. 10 is a schematic diagram of another embodiment of an apparatus 1000 for data transmission according to the present invention. The apparatus is applicable to a UE. The apparatus 1000 includes:

a second determining unit 1010, configured to: when a TAT expires, determine whether a second parameter of a UE satisfies a second uplink synchronization maintenance condition; and a resource releasing unit 1020, configured to: when the second determining unit 1010 determines that the second parameter of the UE satisfies the second uplink synchronization maintenance condition, reserve a first resource; or when the second determining unit 1010 determines that the second parameter of the UE does not satisfy the second uplink synchronization maintenance condition, release all resources inclusive of the first resource, where the second uplink synchronization maintenance condition is used to determine that the UE still maintains an uplink in-sync state after the TAT expires.

Preferably, the second determining unit 1010 may be specifically configured to:

determine, according to the second parameter of the UE, whether the second parameter of the UE satisfies the second uplink synchronization maintenance condition; or predetermine whether the second parameter of the UE satisfies the second uplink synchronization maintenance condition, and store a result of the determining; and acquire the result of the determining, and determine, according to the result of the determining, whether the second parameter of the UE satisfies the second uplink synchronization maintenance condition.

Preferably, the second parameter may include a first resource reservation parameter, where the first resource reservation parameter is used to indicate whether the UE reserves and uses the first resource for sending first information after the TAT expires; and the second determining unit 1010 may be specifically configured to determine, in the following manner, whether the second parameter of the UE satisfies the second uplink synchronization maintenance condition: determining whether the first resource reservation parameter is that the UE reserves and uses the first resource for sending the first information after the TAT expires; and/or the second parameter may include a moving speed of the UE; and the second determining unit 1010 may be specifically configured to determine, in the following manner, whether the second parameter of the UE satisfies the second uplink synchronization maintenance condition: determining whether the moving speed of the UE is not greater than a moving speed threshold; and/or the second parameter may include a TAT running duration type, where the TAT running duration type is used to indicate whether TAT running duration configured by an eNB for the UE is a conservative configuration; and the second determining unit 1010 may be specifically configured to determine, in the following manner, whether the second parameter of the UE satisfies the second uplink synchronization maintenance condition: determining whether the TAT running duration type is a conservative configuration; and/or the second parameter may include whether to use the TAT; and the second determining unit 1010 may be specifically configured to determine, in the following manner, whether the second parameter of the UE satisfies the second uplink synchronization maintenance condition: determining whether the second parameter is not to use the TAT.

Figure 10A:
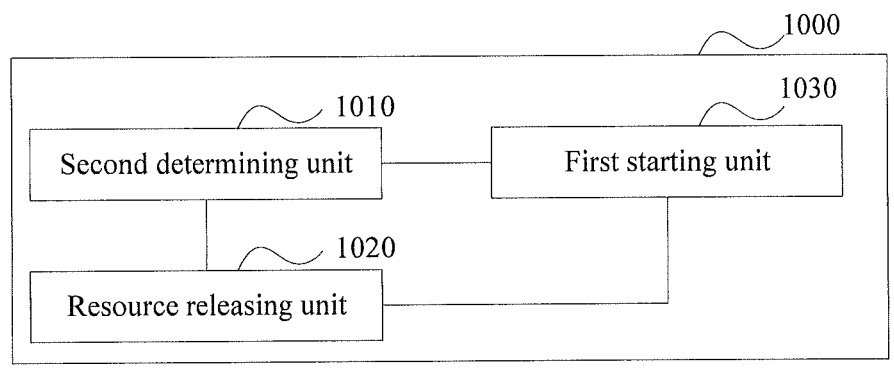
FIG. 10A is a schematic diagram of a fourth embodiment of an apparatus for data transmission according to the present invention.

Preferably, referring to FIG. 10A, the apparatus 1000 may further include:

a first starting unit 1030, configured to: when the TAT expires, if the second determining unit 1010 determines that the second parameter of the UE satisfies the second uplink synchronization maintenance condition, start a second timer, where correspondingly, the resource releasing unit 1020 is further configured to: determine whether the second timer expires; and when the second timer does not expire, reserve the first resource; or when the second timer expires, release the first resource.

Figure 10B:
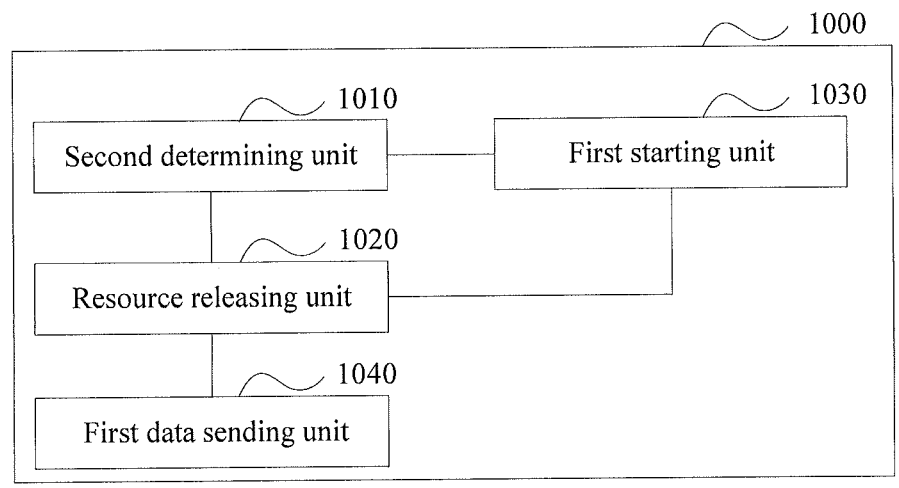
FIG. 10B is a schematic diagram of a fifth embodiment of an apparatus for data transmission according to the present invention.

Preferably, referring to FIG. 10B, the apparatus 1000 may further include:

a first data sending unit 1040, configured to: when the first resource is reserved by the resource releasing unit 1020, if the first information needs to be sent, use the corresponding first resource to send the first information; or when the first resource is released by the resource releasing unit 1020, if the first information needs to be sent, execute a random access procedure, and after uplink synchronization is successfully obtained through the random access procedure and the first resource is obtained through request, use the first resource to send the first information to the eNB.

Figure 10C:
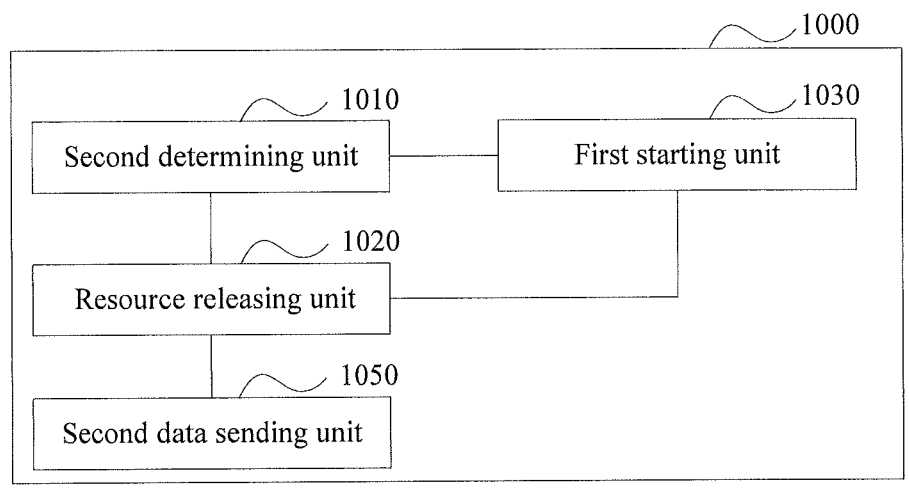
FIG. 10C is a schematic diagram of a sixth embodiment of an apparatus for data transmission according to the present invention.

Alternatively, referring to FIG. 10C, the apparatus 1000 may further include:

a second data sending unit 1050, configured to: when the first resource is reserved by the resource releasing unit 1020, if the first information needs to be sent, execute a random access procedure, and after uplink synchronization is successfully obtained through the random access procedure, use the first resource to send the first information to the eNB; or when the first resource is released by the resource releasing unit 1020, if the first information needs to be sent, execute a random access procedure, and after uplink synchronization is successfully obtained through the random access procedure and the first resource is obtained through request, use the first resource to send the first information to the eNB.

In this embodiment, after a TAT expires, when it is determined that a second parameter of a UE satisfies a second uplink synchronization maintenance condition, a first resource may be further reserved, and therefore, uplink data is directly sent to an eNB when first information needs to be sent, without executing a random access procedure. Therefore, a signaling overhead between the UE and the eNB is reduced, a delay caused by a random access procedure is eliminated, and efficiency of data transmission between the eNB and the UE is improved.

Figure 11:
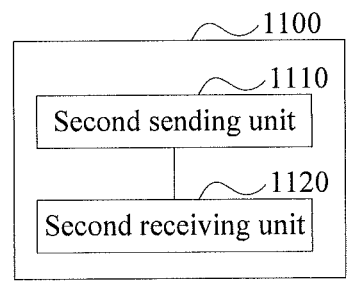
FIG. 11 is a schematic diagram of a seventh embodiment of an apparatus for data transmission according to the present invention.

Referring to FIG. 11, FIG. 11 is a schematic diagram of a seventh embodiment of an apparatus 1100 for data transmission according to the present invention. The apparatus is applicable to an eNB. As shown in FIG. 11, the apparatus 1100 includes:

a second sending unit 1110, configured to send a second configuration parameter to a UE before first information is received, where the second configuration parameter is a parameter required for the UE to determine whether a second parameter satisfies a second uplink synchronization maintenance condition, where the second sending unit 1110 is optional; and a second receiving unit 1120, configured to: after a TAT of the UE expires, receive the first information that is sent by the UE by using a reserved first resource, where the first resource is reserved when the UE determines that the second parameter satisfies the second uplink synchronization maintenance condition.

When the second parameter includes a first resource reservation parameter, the second configuration parameter may include the first resource reservation parameter; and/or when the second parameter includes a moving speed of the UE, the second configuration parameter includes the moving speed of the UE and/or a moving speed threshold; and/or when the second parameter includes a TAT running duration type, the second configuration parameter includes the TAT running duration type; and/or when the second parameter includes whether to use the TAT, the second configuration parameter includes whether to use the TAT.

Figure 11A:
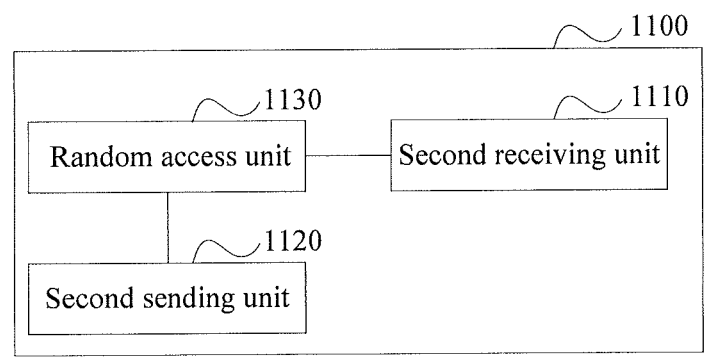
FIG. 11A is a schematic diagram of an eighth embodiment of an apparatus for data transmission according to the present invention.

Preferably, referring to FIG. 11A, the apparatus 1100 may further include:

a random access unit 1130, configured to execute a random access procedure with the UE after the second sending unit sends the second configuration parameter to the UE and before the second receiving unit receives the first information, so that the UE obtains uplink synchronization.

The apparatus shown in FIG. 11 may be used with the apparatus shown in FIG. 10 to FIG. 10B to implement sending of first information to the eNB by the UE after the TAT expires.

The apparatus shown in FIG. 11A may be used with the apparatus shown in FIG. 11C to implement sending of first information to the eNB by the UE after the TAT expires.

Figure 12:
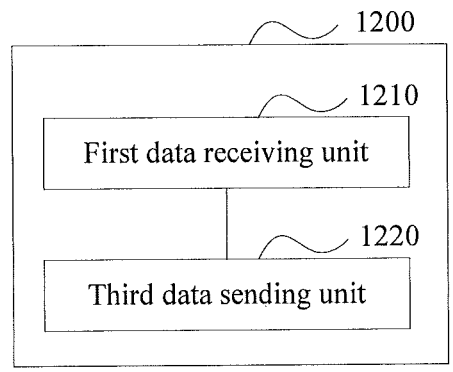
FIG. 12 is a schematic diagram of a ninth embodiment of an apparatus for data transmission according to the present invention.

Referring to FIG. 12, FIG. 12 is a schematic diagram of a ninth embodiment of an apparatus 1200 for data transmission according to the present invention. The apparatus is applicable to a UE. The apparatus 1200 may include:

a first data receiving unit 1210, configured to receive a handover command message sent by a source base station in a handover procedure, where the handover command message includes configuration information of a first resource, and the configuration information is sent by a target base station to the source base station; and a third data sending unit 1220, configured to use, according to the handover command message, the first resource configured according to the configuration information to send first information.

In this embodiment, when a UE is handed over, a target base station directly configures a first resource for the UE, so that after the UE is handed over to the target base station, the UE may directly use the configured resource to transmit corresponding first information, without first executing a random access procedure to request a resource from the target base station. Therefore, a signaling overhead between the UE and the target base station is reduced, and a delay caused by a random access procedure is eliminated.

Figure 13:
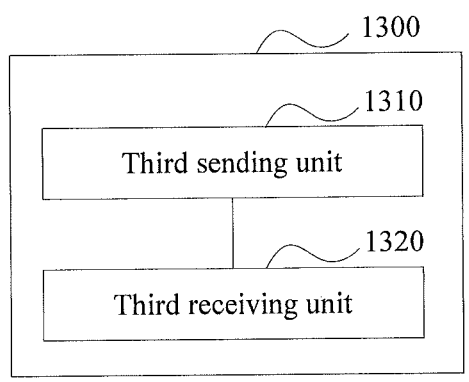
FIG. 13 is a schematic diagram of a tenth embodiment of an apparatus for data transmission according to the present invention.

Referring to FIG. 13, FIG. 13 is a schematic diagram of a tenth embodiment of an apparatus 1300 for data transmission according to the present invention. The apparatus is applicable to an eNB. The apparatus 1300 includes:

a third sending unit 1310, configured to send a handover command message to a UE in a handover procedure, where the handover command message includes configuration information of a first resource, where the configuration information is sent by a target base station; and a third receiving unit 1320, configured to receive first information that is sent by the UE according to the handover command message by using the first resource configured according to the configuration information.

The apparatus may cooperate with the apparatus shown in FIG. 12 to implement sending of first information to the base station by the UE in a handover procedure.

Figure 14:
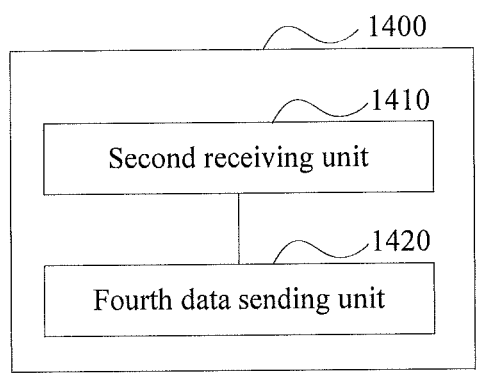
FIG. 14 is a schematic diagram of an eleventh embodiment of an apparatus for data transmission according to the present invention.

Referring to FIG. 14, FIG. 14 is a schematic diagram of an eleventh embodiment of an apparatus 1400 for data transmission according to the present invention. The apparatus is applicable to a UE. The apparatus 1400 may include:

a second data receiving unit 1410, configured to receive a broadcast message sent by an eNB, where the broadcast message includes configuration information of a first resource; and a fourth data sending unit 1420, configured to: during initial access or access reestablishment, if the first information needs to be sent, use the first resource configured according to the configuration information received by the second receiving unit 1410 to send first information.

In this embodiment, an eNB configures a first resource for a UE, so that during initial access or access reestablishment, the UE may directly use the configured first resource to transmit corresponding first information, without first executing a random access procedure to request a resource from the eNB. Therefore, a signaling overhead between the UE and the eNB is reduced, and a delay caused by a random access procedure is eliminated.

Figure 15:
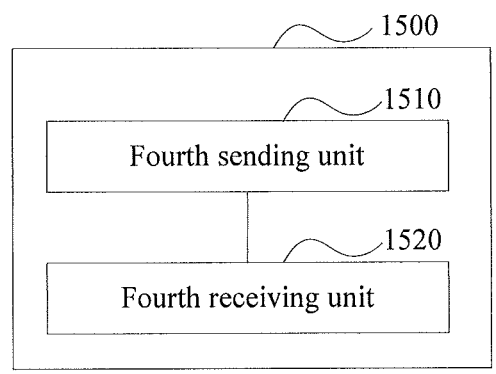
FIG. 15 is a schematic diagram of a twelfth embodiment of an apparatus for data transmission according to the present invention.

Referring to FIG. 15, FIG. 15 is a schematic diagram of a twelfth embodiment of an apparatus 1500 for data transmission according to the present invention. The apparatus is applicable to an eNB. The apparatus 1500 includes:

a fourth sending unit 1510, configured to send a broadcast message to a UE, where the broadcast message includes configuration information of a first resource; and a fourth receiving unit 1520, configured to receive first information that is sent by the UE during initial access or access reestablishment by using the first resource configured according to the configuration information sent by the fourth sending unit 1510.

The apparatus in this embodiment may cooperate with the apparatus shown in FIG. 14 to implement sending of first information to the eNB by the UE during initial access or access reestablishment.

Preferably, the first resource in the apparatus embodiment may include an SR resource, and correspondingly, the first information may include an SR; and/or the first resource may include a CQI resource, and correspondingly, the first information may include a CQI; and/or the first resource may include a PMI resource, and correspondingly, the first information may include a PMI; and/or the first resource may include an RI resource, and correspondingly, the first information may include an RI; and/or the first resource may include an SRS resource, and correspondingly, the first information may include an SRS.

Preferably, the apparatuses, in FIG. 8, FIG. 10, FIG. 12, FIG. 14, and the like, applicable to a UE may further include:

a CQI reporting unit, configured to: when the first parameter of the UE satisfies the first uplink synchronization maintenance condition and/or in a period in which the first resource is reserved, if an aperiodic CQI reporting instruction sent by the eNB is received, report an aperiodic CQI to the eNB in a resource that is scheduled by the eNB in advance for the current aperiodic CQI reporting.

Preferably, the apparatuses applicable to a UE in FIG. 8, FIG. 10, FIG. 12, FIG. 14, and the like may further include:

an SRS reporting unit, configured to: when the first parameter of the UE satisfies the first uplink synchronization maintenance condition and/or in a period in which the first resource is reserved, if an aperiodic SRS reporting instruction sent by the eNB is received, perform aperiodic SRS reporting to the eNB in a resource that is scheduled by the eNB in advance for the current aperiodic SRS reporting.

Preferably, the first parameter and/or the second parameter in the apparatus embodiments may be configured by the eNB for the UE by using an RRC message or a MAC-layer message or a physical-layer message.

Preferably, the apparatuses, in FIG. 8, FIG. 10, FIG. 12, FIG. 14, and the like, applicable to a UE may further include:

a stopping unit, configured to: when access to the eNB fails during execution of the random access procedure, stop a started TAT, and stop applying a TAC in a random access response received in the random access procedure.

Preferably, the apparatuses, in FIG. 9, FIG. 11, FIG. 13, FIG. 15, and the like, applicable to an eNB may further include:

a fifth sending unit, configured to send an aperiodic CQI reporting instruction to the UE when the first parameter of the UE satisfies the first uplink synchronization maintenance condition and/or in a period in which the first resource is reserved; and a fifth receiving unit, configured to receive an aperiodic CQI report of the UE in a resource that is scheduled in advance for the current aperiodic CQI reporting.

Preferably, the apparatuses, in FIG. 9, FIG. 11, FIG. 13, FIG. 15, and the like, applicable to an eNB may further include:

a sixth sending unit, configured to send an aperiodic SRS reporting instruction to the UE when the first parameter of the UE satisfies the first uplink synchronization maintenance condition and/or in a period in which the first resource is reserved; and a sixth receiving unit, configured to receive an aperiodic SRS report of the UE in a resource that is scheduled in advance for the current aperiodic SRS reporting.

Preferably, the first configuration parameter and/or the second configuration parameter are/is sent to the UE by using an RRC message or a MAC-layer message or a physical-layer message.

The embodiments of the apparatuses, in FIG. 8, FIG. 10, FIG. 12, FIG. 14, and the like, for data transmission that are applicable to a UE according to the present invention may be implemented separately, or two or more apparatuses in the embodiments, in FIG. 8, FIG. 10, FIG. 12, FIG. 14, and the like, applicable to a UE may be implemented in combination. When two or more apparatus embodiments are implemented in combination, units having similar functions may also be combined and implemented by using one unit. For example, the first determining unit and the second determining unit may be combined and implemented by using one unit, and the first receiving unit and the second receiving unit may also be combined and implemented by using one unit.

Likewise, the embodiments of the apparatuses, in FIG. 9, FIG. 11, FIG. 13, FIG. 15, and the like, for data transmission that are applicable to an eNB according to the present invention may be implemented separately, or two or more apparatuses in the embodiments, in FIG. 9, FIG. 11, FIG. 13, FIG. 15, and the like, applicable to an eNB may be implemented in combination. When two or more apparatus embodiments are implemented in combination, units having similar functions may also be combined and implemented by using one unit. For example, two or more of the first sending unit to the sixth sending unit may be combined and implemented by using one unit, and two or more of the first receiving unit to the sixth receiving unit may also be combined and implemented by using one unit.

Figure 16:
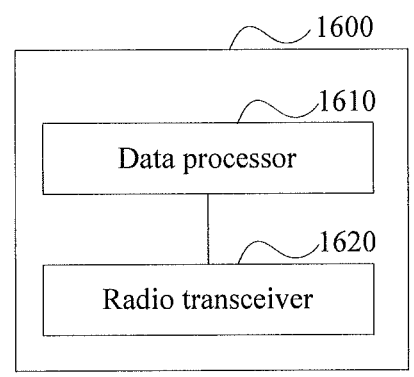
FIG. 16 is a schematic diagram of a first embodiment of a terminal according to the present invention.

An embodiment of the present invention further provides a UE 1600. Referring to FIG. 16, the UE 1600 includes a data processor 1610 and a radio transceiver 1620, where:

the data processor 1610 is configured to: when the radio transceiver 1620 receives downlink data after a TAT expires, determine whether a first parameter of the UE satisfies a first uplink synchronization maintenance condition; and the radio transceiver 1620 is configured to receive the downlink data, and further configured to: when the data processor 1610 determines that the first parameter of the UE satisfies the first uplink synchronization maintenance condition, send, to an eNB, a feedback corresponding to the downlink data; or when the first parameter of the UE does not satisfy the first uplink synchronization maintenance condition, skip sending, to the eNB, the feedback corresponding to the downlink data, where the feedback is used to indicate whether the downlink data is received correctly, and the first synchronization maintenance condition is used to determine that the UE still maintains an uplink in-sync state after the TAT expires.

Preferably, the data processor 1610 may be specifically configured to:

determine, according to the first parameter of the UE, whether the first parameter of the UE satisfies the first uplink synchronization maintenance condition; or predetermine whether the first parameter of the UE satisfies the first uplink synchronization maintenance condition, and store a result of the determining; and acquire the result of the determining, and determine, according to the result of the determining, whether the first parameter of the UE satisfies the first uplink synchronization maintenance condition.

Preferably, the first parameter may include a first feedback parameter, and the first feedback parameter is used to indicate whether the UE feeds back with respect to the downlink data after the TAT expires; and the data processor 1610 may be specifically configured to determine whether the first feedback parameter is that the UE feeds back with respect to the downlink data after the TAT expires; and/or the first parameter may include a first feedback parameter and a time span between a time of receiving the downlink data and a time of expiry of the TAT; and the data processor 1610 may be specifically configured to determine whether the first feedback parameter is that the UE feeds back with respect to the downlink data after the TAT expires, and determine whether the time span between the time of receiving the downlink data and the time of expiry of the TAT is not greater than a first time span threshold; and/or the first parameter may include a moving speed of the UE; and the data processor 1610 may be specifically configured to determine whether the moving speed of the UE is not greater than a moving speed threshold; and/or the first parameter may include a TAT running duration type; and the data processor 1610 may be specifically configured to determine whether the TAT running duration type is a conservative configuration; and/or the first parameter may include whether to use the TAT; and the data processor 1610 may be specifically configured to determine whether the first parameter is not to use the TAT.

Preferably, the data processor 1610 may be further configured to: when the TAT expires, determine whether a second parameter of the UE satisfies a second uplink synchronization maintenance condition; and the radio transceiver 1620 may be further configured to: when the data processor determines that the second parameter of the UE satisfies the second uplink synchronization maintenance condition, reserve a first resource; or when the second parameter of the UE does not satisfy the second uplink synchronization maintenance condition, release all resources inclusive of the first resource, where the second uplink synchronization maintenance condition is used to determine that the UE still maintains the uplink in-sync state after the TAT expires.

Preferably, the data processor 1610 may be specifically configured to:

determine, according to the second parameter of the UE, whether the second parameter of the UE satisfies the second uplink synchronization maintenance condition; or predetermine whether the second parameter of the UE satisfies the second uplink synchronization maintenance condition, and store a result of the determining; and acquire the result of the determining, and determine, according to the result of the determining, whether the second parameter of the UE satisfies the second uplink synchronization maintenance condition.

Preferably, the second parameter may include a first resource reservation parameter, where the first resource reservation parameter is used to indicate whether the UE reserves and uses the first resource for sending first information after the TAT expires; and the data processor 1610 may be specifically configured to determine whether the first resource reservation parameter is that the UE reserves and uses the first resource for sending the first information after the TAT expires; and/or the second parameter may include a moving speed of the UE; and the data processor 1610 may be specifically configured to determine whether the moving speed of the UE is not greater than a moving speed threshold; and/or the second parameter may include a TAT running duration type, where the TAT running duration type is used to indicate whether TAT running duration configured by the eNB for the UE is a conservative configuration; and the data processor 1610 may be specifically configured to determine whether the TAT running duration type is a conservative configuration; and/or the second parameter includes whether to use the TAT; and the data processor 1610 may be specifically configured to determine whether the second parameter is not to use the TAT.

Figure 16A:
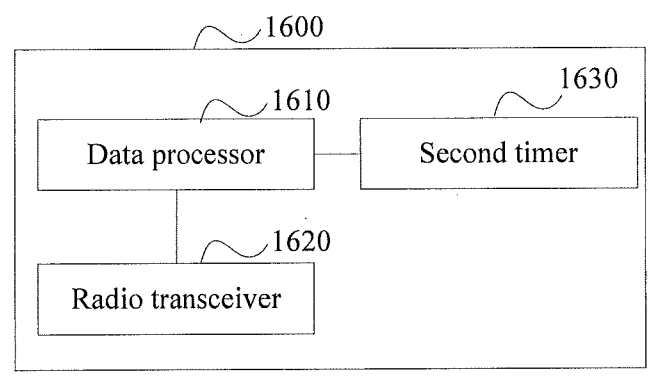
FIG. 16A is a schematic diagram of a second embodiment of a terminal according to the present invention.

Preferably, referring to FIG. 16A, the UE 1600 may further include a second timer 1630;

correspondingly, the data processor 1610 may be further configured to: when the TAT expires, if it is determined that the second parameter of the UE satisfies the second uplink synchronization maintenance condition, start the second timer; and correspondingly, the data processor 1610 may be further configured to: determine whether the second timer 1630 expires; and when the second timer 1630 does not expire, reserve the first resource; or when the second timer 1630 expires, release the first resource.

Preferably, the radio transceiver 1620 may be further configured to: when the first resource is reserved, if the first information needs to be sent, use the corresponding first resource to send the first information; or when the first resource is released, if the first information needs to be sent, execute a random access procedure, and after uplink synchronization is successfully obtained through the random access procedure and the first resource is obtained through request, use the first resource to send the first information to the eNB.

Preferably, the radio transceiver 1620 may be further configured to: when the first resource is reserved, if the first information needs to be sent, execute a random access procedure, and after uplink synchronization is successfully obtained through the random access procedure, use the first resource to send the first information to the eNB; or when the first resource is released, if the first information needs to be sent, execute a random access procedure, and after uplink synchronization is successfully obtained through the random access procedure and the first resource is obtained through request, use the first resource to send the first information to the eNB.

Preferably, the radio transceiver 1620 may be further configured to: receive a handover command message sent by a source base station in a handover procedure, where the handover command message includes configuration information of the first resource, and the configuration information is sent by a target base station to the source base station; and use, according to the handover command message, the first resource configured according to the configuration information to send the first information.

Preferably, the radio transceiver 1620 may be further configured to: receive a broadcast message sent by the eNB, where the broadcast message includes the configuration information of the first resource; and during initial access or access reestablishment, if the first information needs to be sent, use the first resource configured according to the configuration information to send the first information.

Preferably, the first resource may include an SR resource, and correspondingly, the first information may include an SR; and/or the first resource may include a CQI resource, and correspondingly, the first information may include a CQI; and/or the first resource may include a PMI resource, and correspondingly, the first information may include a PMI; and/or the first resource may include an RI resource, and correspondingly, the first information may include an RI; and/or the first resource may include an SRS resource, and correspondingly, the first information may include an SRS.

Preferably, the radio transceiver 1620 may be further configured to: when the first parameter of the UE satisfies the first uplink synchronization maintenance condition and/or in a period in which the first resource is reserved, if an aperiodic CQI reporting instruction sent by the eNB is received, report an aperiodic CQI to the eNB in a resource that is scheduled by the eNB in advance for the current aperiodic CQI reporting.

Preferably, the radio transceiver 1620 may be further configured to: when the first parameter of the UE satisfies the first uplink synchronization maintenance condition and/or in a period in which the first resource is reserved, if an aperiodic SRS reporting instruction sent by the eNB is received, perform aperiodic SRS reporting to the eNB in a resource that is scheduled by the eNB in advance for the current aperiodic SRS reporting.

Preferably, the first parameter and/or the second parameter may be configured by the eNB for the UE by using an RRC message or a MAC-layer message or a physical-layer message.

Preferably, the data processor 1610 may be further configured to: when access to the eNB fails during execution of the random access procedure, stop a started TAT, and stop applying a TAC in a random access response received in the random access procedure.

For the UE shown in FIG. 16 and FIG. 16A, after a TAT expires, if downlink data is received, it is determined that a first parameter of the UE satisfies a first uplink synchronization maintenance condition, that is, it is determined that the UE still maintains an uplink in-sync state although the TAT expires; in this case, a feedback corresponding to the downlink data is directly sent to an eNB without executing a random access procedure, and therefore the feedback is sent to the eNB in a timely manner. Therefore, a problem that the eNB retransmits the downlink data for multiple times caused when the eNB cannot receive the feedback of the UE in a timely manner is solved, and downlink data transmission resources between the eNB and the UE are saved.

In addition, because the random access procedure does not need to be executed between the UE and the eNB, a signaling overhead between the UE and the eNB is reduced, a delay caused by a random access procedure is eliminated, and efficiency of data transmission between the eNB and the UE is improved.

In addition, after the TAT expires, when it is determined that a second parameter of the UE satisfies a second uplink synchronization maintenance condition, a first resource may be further reserved, and therefore, uplink data is directly sent to the eNB when first information needs to be sent, without executing a random access procedure. Therefore, the signaling overhead between the UE and the eNB is further reduced, a delay caused by a random access procedure is eliminated, and efficiency of data transmission between the eNB and the UE is improved.

Figure 17:
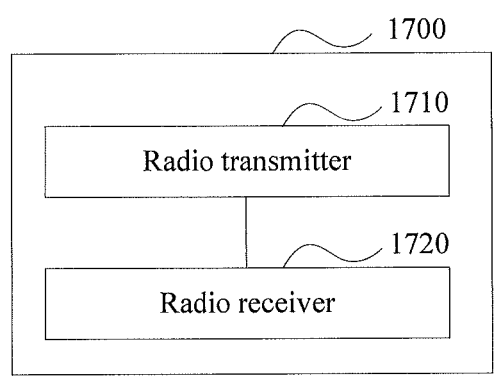
FIG. 17 is a schematic diagram of an embodiment of an eNB according to the present invention.

Referring to FIG. 17, FIG. 17 is a schematic diagram of an embodiment of an eNB 1700 according to the present invention. The eNB 1700 includes a radio transmitter 1710 and a radio receiver 1720, where:

the radio transmitter 1710 is configured to send downlink data to a UE after a TAT of the UE expires; and the radio receiver 1720 is configured to receive a feedback that is sent by the UE with respect to the downlink data, where the feedback is sent by the UE when the UE determines that a first parameter satisfies a first uplink synchronization maintenance condition.

Preferably, the radio transmitter 1710 is further configured to: before sending the downlink data to the UE, send a first configuration parameter to the UE, where the first configuration parameter is a parameter required for the UE to determine whether the first parameter satisfies the first uplink synchronization maintenance condition.

Preferably, when the first parameter includes a first feedback parameter, the first configuration parameter may include the first feedback parameter of the UE; and/or when the first parameter includes a first feedback parameter and a time span between a time of receiving the downlink data and a time of expiry of the TAT, the first configuration parameter may include the first feedback parameter and/or a first time span threshold corresponding to the time span; and/or when the first parameter includes a moving speed of the UE, the first configuration parameter may include the moving speed of the UE and/or a moving speed threshold; and/or when the first parameter includes a TAT running duration type, the first configuration parameter may include the TAT running duration type; and/or when the first parameter includes whether to use the TAT, the first configuration parameter may include whether to use the TAT.

Preferably, the radio receiver 1720 is further configured to: after the TAT of the UE expires, receive first information that is sent by the UE by using a reserved first resource, where the first resource is reserved when the UE determines that a second parameter satisfies a second uplink synchronization maintenance condition.

Preferably, the radio transmitter 1710 is further configured to send a second configuration parameter to the UE before the first information is received, where the second configuration parameter is a parameter required for the UE to determine whether the second parameter satisfies the second uplink synchronization maintenance condition.

Preferably, when the second parameter includes a first resource reservation parameter, the second configuration parameter may include the first resource reservation parameter; and/or when the second parameter includes a moving speed of the UE, the second configuration parameter may include the moving speed of the UE and/or a moving speed threshold; and/or when the second parameter includes a TAT running duration type, the second configuration parameter may include the TAT running duration type; and/or when the second parameter includes whether to use the TAT, the second configuration parameter may include whether to use the TAT.

Preferably, the radio receiver 1720 is further configured to execute a random access procedure with the UE after the second configuration parameter is sent to the UE and before the first information is received, so that the UE obtains uplink synchronization.

Preferably, the radio transmitter 1710 is further configured to send a handover command message to the UE in a handover procedure, where the handover command message includes configuration information of the first resource, and the configuration information is sent by a target base station; and the radio receiver 1720 is further configured to receive the first information that is sent by the UE according to the handover command message by using the first resource configured according to the configuration information.

Preferably, the radio transmitter 1710 is further configured to send a broadcast message to the UE, where the broadcast message includes the configuration information of the first resource; and the radio receiver 1720 is further configured to receive the first information that is sent by the UE during initial access or access reestablishment by using the first resource configured according to the configuration information.

Preferably, the first resource includes an SR resource, and correspondingly, the first information includes an SR; and/or the first resource includes a CQI resource, and correspondingly, the first information includes a CQI; and/or the first resource includes a PMI resource, and correspondingly, the first information includes a PMI; and/or the first resource includes an RI resource, and correspondingly, the first information includes an RI; and/or the first resource includes an SRS resource, and correspondingly, the first information includes an SRS.

Preferably, the radio transmitter 1710 is further configured to send an aperiodic CQI reporting instruction to the UE when the first parameter of the UE satisfies the first uplink synchronization maintenance condition and/or in a period in which the first resource is reserved; and the radio receiver 1720 is further configured to receive an aperiodic CQI report of the UE in a resource that is scheduled in advance for the current aperiodic CQI reporting.

Preferably, the radio transmitter 1710 is further configured to send an aperiodic SRS reporting instruction to the UE when the first parameter of the UE satisfies the first uplink synchronization maintenance condition and/or in a period in which the first resource is reserved; and the radio receiver 1720 is further configured to receive an aperiodic SRS report of the UE in a resource that is scheduled in advance for the current aperiodic SRS reporting.

Preferably, the first configuration parameter and/or the second configuration parameter are/is sent to the UE by using an RRC message or a MAC-layer message or a physical-layer message.

The eNB in this embodiment may cooperate with the UE shown in FIG. 16 to implement sending of a feedback to the base station with respect to the downlink data by the UE after the TAT in the UE expires; and may further implement sending of first information to the base station by the UE.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method for data transmission, comprising:

when downlink data is received after a time alignment timer (TAT) expires, determining whether a first parameter of a user equipment (UE) satisfies a first uplink synchronization maintenance condition, the first uplink synchronization maintenance condition indicating that an in-sync uplink is maintained after the TAT expires;

when the first parameter of the UE satisfies the first uplink synchronization maintenance condition, sending, to a base station using the in-sync uplink that is maintained after the TAT expires, a feedback corresponding to the downlink data; and when the first parameter of the UE does not satisfy the first uplink synchronization maintenance condition, skipping sending, to the base station, the feedback corresponding to the downlink data, wherein the feedback is used to identify whether the downlink data is received correctly.

2. The method according to claim 1, wherein the determining whether the first parameter of the UE satisfies a first uplink synchronization maintenance condition comprises:

determining, according to the first parameter of the UE, whether the first parameter of the UE satisfies the first uplink synchronization maintenance condition; or predetermining whether the first parameter of the UE satisfies the first uplink synchronization maintenance condition, and storing a result of the determining; and acquiring the result of the determining, and determining, according to the result of the determining or predetermining, whether the first parameter of the UE satisfies the first uplink synchronization maintenance condition.

3. The method according to claim 2, wherein:

the first parameter comprises a first feedback parameter, and the first feedback parameter is used to indicate whether the UE feeds back with respect to the downlink data after the TAT expires, and the determining whether the first parameter of the UE satisfies the first uplink synchronization maintenance condition comprises determining whether the first feedback parameter is that the UE feeds back with respect to the downlink data after the TAT expires; and/or the first parameter comprises a first feedback parameter and a time span between a time of receiving the downlink data and a time of expiry of the TAT, and the determining whether the first parameter of the UE satisfies the first uplink synchronization maintenance condition comprises determining whether the first feedback parameter is that the UE feeds back with respect to the downlink data after the TAT expires, and determining whether the time span between the time of receiving the downlink data and the time of expiry of the TAT is not greater than a first time span threshold; and/or the first parameter comprises a moving speed of the UE, and the determining whether the first parameter of the UE satisfies the first uplink synchronization maintenance condition comprises determining whether the moving speed of the UE is not greater than a moving speed threshold; and/or the first parameter comprises a TAT running duration type, and the determining whether the first parameter of the UE satisfies the first uplink synchronization maintenance condition comprises determining whether the TAT running duration type is a conservative configuration; and/or the first parameter comprises whether to use the TAT, and the determining whether the first parameter of the UE satisfies the first uplink synchronization maintenance condition comprises determining whether the first parameter is not to use the TAT.

4. The method according to claim 1, further comprising:
when the TAT expires, determining whether a second parameter of the UE satisfies a second uplink synchronization maintenance condition; and
when the second parameter of the UE satisfies the second uplink synchronization maintenance condition, reserving a first resource; or
when the second parameter of the UE does not satisfy the second uplink synchronization maintenance condition, releasing all resources inclusive of the first resource, wherein
the second uplink synchronization maintenance condition is used to determine that the UE still maintains the uplink in-sync state after the TAT expires.

5. The method according to claim 4, wherein the determining whether a second parameter of the UE satisfies a second uplink synchronization maintenance condition comprises:
determining, according to the second parameter of the UE, whether the second parameter of the UE satisfies the second uplink synchronization maintenance condition; or
predetermining whether the second parameter of the UE satisfies the second uplink synchronization maintenance condition, and storing a result of the determining; and
acquiring the result of the determining, and determining, according to the result of the determining, whether the second parameter of the UE satisfies the second uplink synchronization maintenance condition.

6. The method according to claim 5, wherein the second parameter comprises a first resource reservation parameter, and the first resource reservation parameter is used to indicate whether the UE reserves and uses the first resource for sending first information after the TAT expires; and
the determining whether the second parameter of the UE satisfies the second uplink synchronization maintenance condition comprises: determining whether the first resource reservation parameter is that the UE reserves and uses the first resource for sending the first information after the TAT expires; and/or
the second parameter comprises a moving speed of the UE; and the determining whether the second parameter of the UE satisfies the second uplink synchronization maintenance condition comprises: determining whether the moving speed of the UE is not greater than a moving speed threshold; and/or
the second parameter comprises a TAT running duration type, wherein the TAT running duration type is used to indicate whether TAT running duration configured by the base station for the UE is a conservative configuration; and the determining whether the second parameter of the UE satisfies the second uplink synchronization maintenance condition comprises: determining whether the TAT running duration type is a conservative configuration; and/or
the second parameter comprises whether to use the TAT; and the determining whether the second parameter of the UE satisfies the second uplink synchronization maintenance condition comprises: determining whether the second parameter is not to use the TAT.

7. The method according to claim 6, wherein: the first resource comprises a scheduling request (SR) resource, and correspondingly, the first information comprises an SR; and/or
the first resource comprises a channel quality indicator (CQI) resource, and correspondingly, the first information comprises a CQI; and/or
the first resource comprises a precoding matrix indicator (PMI) resource, and correspondingly, the first information comprises a PMI; and/or
the first resource comprises an rank indicator (RI) resource, and correspondingly, the first information comprises an RI; and/or
the first resource comprises an sounding reference signal (SRS) resource, and correspondingly, the first information comprises an SRS.

8. The method according to claim 1, wherein the first parameter and/or a second parameter are/is configured by the base station for the UE by using a radio resource control (RRC) message or a media access control (MAC) layer message or a physical-layer message.

9. An apparatus for data transmission, comprising:
at least one hardware processor;
a memory interfaced to the at least one hardware processor, the memory including instructions to control the at least one hardware processor to:
when downlink data is received after a time alignment timer (TAT) expires, determine whether a first parameter of a user equipment (UE) satisfies a first uplink synchronization maintenance condition, the first uplink synchronization maintenance condition indicating that an in-sync uplink is maintained after the TAT expires;
when the at least one hardware processor determines that the first parameter of the UE satisfies the first uplink synchronization maintenance condition, send, to a base station using the in-sync uplink that is maintained after the TAT expires, a feedback corresponding to the downlink data, wherein the feedback is used to indicate whether the downlink data is received correctly; and
when the at least one hardware processor determines that the first parameter of the UE does not satisfy the first uplink synchronization maintenance condition, skip sending, to the base station, a feedback corresponding to the downlink data.

10. The apparatus according to claim 9, wherein the instructions further control the at least one hardware processor to:
determine, according to the first parameter of the UE, whether the first parameter of the UE satisfies the first uplink synchronization maintenance condition; or
predetermine whether the first parameter of the UE satisfies the first uplink synchronization maintenance condition, and store a result of the determining; and
acquire the result of the determining, and determine, according to the result of the determining, whether the first parameter of the UE satisfies the first uplink synchronization maintenance condition.

11. The apparatus according to claim 10, wherein:
the first parameter comprises a first feedback parameter, and the first feedback parameter is used to indicate whether the UE feeds back with respect to the downlink data after the TAT expires, and the instructions further control the at least one hardware processor to determine whether the first parameter of the UE satisfies the first uplink synchronization maintenance condition by determining whether the first feedback parameter is that the UE feeds back with respect to the downlink data after the TAT expires; and/or the first parameter comprises a first feedback parameter and a time span between a time of receiving the downlink data and a time of expiry of the TAT, and the instructions further control the at least one hardware processor to determine whether the first parameter of the UE satisfies the first uplink synchronization maintenance condition by determining whether the first feedback parameter is that the UE feeds back with respect to the downlink data after the TAT expires, and determining whether the time span between the time of receiving the downlink data and the time of expiry of the TAT is not greater than a first time span threshold; and/or the first parameter comprises a moving speed of the UE, and the instructions further control the at least one hardware processor to determine whether the first parameter of the UE satisfies the first uplink synchronization maintenance condition by determining whether the moving speed of the UE is not greater than a moving speed threshold; and/or the first parameter comprises a TAT running duration type, and the instructions further control the at least one hardware processor to determine whether the first parameter of the UE satisfies the first uplink synchronization maintenance condition by determining whether the TAT running duration type is a conservative configuration; and/or the first parameter comprises whether to use the TAT, and the instructions further control the at least one hardware processor to determine whether the first parameter of the UE satisfies the first uplink synchronization maintenance condition by determining whether the first parameter is not to use the TAT.

12. The apparatus according to claim 9, wherein the instructions further control the at least one hardware processor to:
when the TAT expires, determine whether a second parameter of the UE satisfies a second uplink synchronization maintenance condition; and
upon determining the second parameter of the UE satisfies the second uplink synchronization maintenance condition, reserve a first resource; or upon determining the second parameter of the UE does not satisfy the second uplink synchronization maintenance condition, release all resources inclusive of the first resource, wherein the second uplink synchronization maintenance condition is used to determine that the UE still maintains the uplink in-sync state after the TAT expires.

13. The apparatus according to claim 9, wherein the first parameter and/or a second parameter are/is configured by the base station for the UE by using a radio resource control (RRC) message or a media access control (MAC) layer message or a physical-layer message.

14. A user equipment (UE), comprising a data processor and a radio transceiver, wherein:
when the radio transceiver receives downlink data after a time alignment timer (TAT) expires, the data processor determines whether a first parameter of the UE satisfies a first uplink synchronization maintenance condition, the first uplink synchronization maintenance condition indicating that an in-sync uplink is maintained after the TAT expires, and the radio transceiver is configured to receive the downlink data, and further configured to: when the data processor determines that the first parameter of the UE satisfies the first uplink synchronization maintenance condition, send, to a base station using the in-sync uplink that is maintained after the TAT expires, a feedback corresponding to the downlink data; or when the first parameter of the UE does not satisfy the first uplink synchronization maintenance condition, skip sending, to the base station, a feedback corresponding to the downlink data, and the feedback is used to indicate whether the downlink data is received correctly.

15. A method for data transmission, comprising:
sending downlink data to a user equipment (UE) after a time alignment timer (TAT) of the UE expires; and
receiving, using an in-sync uplink that is maintained after the TAT expires, a feedback that is sent by the UE with respect to the downlink data, wherein the feedback is sent by the UE when the UE determines that a first parameter satisfies a first uplink synchronization maintenance condition which thereby maintains the in-synch uplink after the TAT expires.

16. The method according to claim 15, further comprising:
when the first parameter of the UE satisfies the first uplink synchronization maintenance condition and/or in a period in which a first resource is reserved, sending an aperiodic channel quality indicator (CQI) reporting instruction to the UE, and receiving an aperiodic CQI report of the UE in a resource that is scheduled in advance for the current aperiodic CQI reporting.

17. An apparatus for data transmission, comprising:
at least one hardware processor;
a memory interfaced to the at least one hardware processor, the memory including instructions to control the at least one hardware processor to:
send downlink data to a user equipment (UE) after a time alignment timer (TAT) of the UE expires; and
receive, using an in-sync uplink that is maintained after the TAT expires, a feedback that is sent by the UE with respect to the downlink data, wherein the feedback is sent by the UE when the UE determines that a first parameter satisfies a first uplink synchronization maintenance condition which thereby maintains the in-synch uplink after the TAT expires.

18. The apparatus according to claim 17, wherein the instructions further control the at least one hardware processor to receive, after the TAT of the UE expires, first information that is sent by the UE by using a reserved first resource, wherein the first resource is reserved when the UE determines that a second parameter satisfies a second uplink synchronization maintenance condition.

19. An enhanced NodeB (eNB), comprising a radio transmitter and a radio receiver, wherein:
the radio transmitter is configured to send downlink data to a user equipment (UE) after a time alignment timer (TAT) of the UE expires; and
the radio receiver is configured to receive, using an in-sync uplink that is maintained after the TAT expires, a feedback that is sent by the UE with respect to the downlink data, wherein the feedback is sent by the UE when the UE determines that a first parameter satisfies a first uplink synchronization maintenance condition which thereby maintains the in-synch uplink after the TAT expires.

20. The eNB according to claim 19, wherein the radio receiver is further configured to: after the TAT of the UE expires, receive first information that is sent by the UE by using a reserved first resource, wherein the first resource is reserved when the UE determines that a second parameter satisfies a second uplink synchronization maintenance condition.

* * * * *